(12) United States Patent
Strickland

(10) Patent No.: US 7,739,238 B2
(45) Date of Patent: Jun. 15, 2010

(54) METHOD OF DIGITAL MEDIA MANAGEMENT IN A FILE SHARING SYSTEM

(76) Inventor: Mark Strickland, 623 Erbes Rd., Thousand Oaks, CA (US) 91362

( * ) Notice: Subject to any disclaimer, the term of this patent is extended or adjusted under 35 U.S.C. 154(b) by 431 days.

(21) Appl. No.: 11/753,024

(22) Filed: May 24, 2007

(65) Prior Publication Data

US 2007/0226368 A1 Sep. 27, 2007

Related U.S. Application Data

(63) Continuation-in-part of application No. 11/364,170, filed on Mar. 1, 2006.

(60) Provisional application No. 60/661,390, filed on Mar. 14, 2005.

(51) Int. Cl.
*G06F 17/30* (2006.01)

(52) U.S. Cl. .................. 707/622; 707/913; 705/59; 709/219

(58) Field of Classification Search .................. 707/10, 707/101, 102, 104.1; 705/53, 59; 709/203, 709/219, 223, 225, 249
See application file for complete search history.

(56) References Cited

U.S. PATENT DOCUMENTS

| | | | |
|---|---|---|---|
| 6,794,567 B2 | 9/2004 | Hughes et al. | |
| 6,856,989 B1 | 2/2005 | Zhou et al. | |
| 6,938,042 B2 | 8/2005 | Aboulhosn et al. | |
| 7,155,415 B2* | 12/2006 | Russell et al. | 705/59 |
| 7,356,709 B2* | 4/2008 | Gunyakti et al. | 713/193 |
| 2002/0138576 A1 | 9/2002 | Schleicher et al. | |
| 2002/0184128 A1 | 12/2002 | Holtsinger | |
| 2004/0039707 A9 | 2/2004 | Ricci | |
| 2004/0181487 A1 | 9/2004 | Hanson | |
| 2004/0205027 A1 | 10/2004 | Vidor | |
| 2005/0004941 A1 | 1/2005 | Kalker et al. | |
| 2005/0021394 A1 | 1/2005 | Miedema et al. | |
| 2005/0080746 A1* | 4/2005 | Zhu et al. | 705/59 |
| 2005/0154608 A1 | 7/2005 | Paulson et al. | |
| 2006/0085251 A1 | 4/2006 | Greene | |
| 2007/0198660 A1* | 8/2007 | Cohen | 709/219 |
| 2007/0276841 A1* | 11/2007 | Rhoads et al. | 707/10 |

(Continued)

OTHER PUBLICATIONS

Jukes. "Peer Impact Announces Agreement with EMI Music and Becomes First Peer-To-Peer . . . ". Wurld Media, Inc. Press Release. Feb. 22, 2005. Saratoga Springs, NY, USA.

(Continued)

*Primary Examiner*—Leslie Wong
(74) *Attorney, Agent, or Firm*—Kristina Castellano

(57) ABSTRACT

Provided are methods and systems for legally sharing files in a peer-to-peer network on the internet in a manner that compensates the content owners, artists, authors and/or programmers, and the like. Example methods include incentive programs, which allow users to earn credits that may be redeemable for later file downloads and/or for merchandise at an online store or other compensation. Example methods do not permit file exchanges or downloads when the file is tagged with ownership information that indicates a gap in ownership of the file, in which one or more content owners was not compensated. Further example methods permit file exchanges or downloads, but provide that one or more of the users is disqualified from receiving credits for files tagged with information indicating a gap in ownership of the file.

22 Claims, 16 Drawing Sheets

U.S. PATENT DOCUMENTS

2008/0002854 A1* 1/2008 Tehranchi et al. ........... 382/100

OTHER PUBLICATIONS

Jukes. "Wurld Media Reveals Technology Behind Their Legitimate P2P File-Sharing Network, Peer . . . ". Wurld Media, Inc. Press Release. Apr. 21, 2005. Saratoga Springs, NY, USA.

Jukes. "Wurld Media Announces Conclusion of Agreements with Sony BMG, Universal Music Group . . . ". Wurld Media, Inc. Press Release. Nov. 24, 2004. Saratoga Springs, NY, USA.

"Share Your Weed Files". Weedshare.com. 2003-2005. Shared Media Licensing, Inc. Jul. 7, 2006.

Borland. "Trade group proposes new P2P music model". CNET News.com. Feb. 5, 2004.

"All About Weed Files". WeedStash.com. 2004: Frans Keylard. Jul. 7, 2006.

"Send as many 1GB files as you like . . . Free." YouSendIt.com. 2006. Jul. 7, 2006.

"Grooveshark", University of Florida, Feb. 2007.

"Grooveshark", Press kit, Mar. 14, 2007.

International Search Report and Written Opinion dated Apr. 10, 2008 in related PCT application PCT/US06/07083.

* cited by examiner

LANE CLOSING FEATURE

LANE CLOSING FEATURE – FROM THE UPLOADER'S PERSPECTIVE

MY ACCOUNT

| | | | | |
|---|---|---|---|---|
| ACCOUNT# | | | SEARCH | ^ By Artist |
| | | | VIEW ACTIVIY | |
| USER NAME | jdoe | | LANE CLOSING ON/OFF | |
| E-MAIL | jd@aol.com | | BANDWIDTH | ^ MEDIUM |

DISCOGRAPHY
ONLINE STORE

| CREDITS | SILVER | BLUE | GOLD |
|---|---|---|---|
| VIEW HISTORY | 10 | 0 | 18 |
| POINTS | 1 | | |
| | | | |
| PURCHASES | 1 | 1 | |
| FILES REDEEMED | | | 1 |
| ONLINE STORE | 1 | | |

FIG. 12

LANE CLOSING FEATURE – FROM THE DOWNLOADER'S PERSPECTIVE

SEARCH RESULTS - CHOOSE YOUR SELECTION

| | SEARCH RESULTS | | | | | | |
|---|---|---|---|---|---|---|---|
| Last/ | Song Title | Album | Label | | Bit Rate | Song Code | Geo Code |
| Eagles | Hotel California | Hotel California | Elektra | T-1 | 160kbp | 123 | 90210 |
| Eagles | Hotel California | Hotel California | Elektra | DSL | 128kbps | 123 | 90125 |
| Eagles | LANE CLOSING | Hotel California | Elektra | CABL | 80kbps | 123 | 91234 |
| Eagles | Hotel California | Eagles' Tribute | Fly By Night | Dial | 160kbps | 123 | 98765 |

FIG. 13

SEARCH RESULTS - CHOOSE YOUR SELECTION –FROM THE DOWNLOADER'S PERSPECTIVE

SEARCH RESULTS

| Last/ | Song Title | Album | Label | | Bit Rate | Song Code | Geo Code |
|---|---|---|---|---|---|---|---|
| U2 | One | Achtung Baby | Island/Int. | T-1 | 160kbps | 123 | 90210 |
| U2 | One | Achtung Baby | Island/Int. | DSL | 128kbps | 123 | 90125 |
| U2 | LANE CLOSED | Achtung Baby | Island/Int. | CABL | 80kbps | 123 | 91234 |
| U2 | One | Achtung Baby | Island/Int. | Dial | 160kbps | 123 | 98765 |

FIG. 14

SORT FEATURE

VIEW DOWNLOADER ACTIVITY

| First | Last | Song Title | Modem | Credit | Bandwidth | Complete | Geo Code |
|---|---|---|---|---|---|---|---|
| Sarah | McLachlan | World On Fire | T-1 | Silver | 4 Meg | 99% | 90210 |
| John | Mayer | Daughters | DSL | Blue | 3 Meg | 49% | 90125 |
| Eminem | Eminem | Over And Over | CABLE | Silver | 5 Meg | 24% | 98765 |
| Norah | Jones | Sunrise | Dial-Up | Silver | 4 Meg | 10% | 91011 |
| The | Beatles | Hey Jude | Dial-Up | Silver | 6 Meg | 50% | 90125 |

FIG. 16

METHOD OF DIGITAL MEDIA MANAGEMENT IN A FILE SHARING SYSTEM

CROSS REFERENCE TO RELATED APPLICATIONS

This application is a Continuation-in-part of U.S. application Ser. No. 11/364,170 filed on Mar. 1, 2006, which claims the benefit of U.S. Provisional Patent Application Ser. No. 60/661,390, filed Mar. 14, 2005.

FIELD

Provided are methods and systems for legally sharing files on the internet in a manner that compensates the content owners and optionally the artists.

BACKGROUND

Billions of music, movies, TV shows, games, and software files are illegally downloaded through peer-to-peer (P2P) websites. Because of this illegal downloading, creators (such as artists, authors, and programmers) and content owners are losing potential income, which is resulting in, inter alia, record labels merging and downsizing, artists not having their contracts renewed, and creators and content owners not being compensated for this illegal use of copyrighted material.

Websites that allow illegal P2P downloading/uploading also have problems associated with poorly encoded downloads, low bandwith, junk software and create a high risk to users of downloading malicious files, such as a computer viruses, Trojan horses, spyware, pornography and/or spoof files. In addition, users of these websites, run the risk of civil or criminal legal action.

SUMMARY

Example embodiments provide file sharing methods and systems, which provide incentives to users to purchase files from a legal peer-to-peer network, and which compensate content owners and/or creators.

Example embodiments also provide various methods, systems, and features attendant to such a legal peer-to-peer network, such as providing premium files, scanning for malicious files, chat rooms, a "this-lane closed" feature and other features.

Example embodiments also provide machine readable mediums and computer readable program products relating to the disclosed methods and systems.

BRIEF DESCRIPTION OF THE DRAWINGS

FIG. 12 is an example of a possible screen shot from the uploader's perspective during the process of a lane closing according to non-limiting example embodiments.

FIG. 13 is an example of a possible screen shot from the downloader's perspective during the process of a lane closing according to non-limiting example embodiments.

FIG. 14 is an example of a possible screen shot from the downloader's perspective during the process of a lane closing according to non-limiting example embodiments.

FIG. 16 is an example of a possible screen shot of a discography allowing a sort feature according to non-limiting example embodiments.

DETAILED DESCRIPTION

Figure 1:
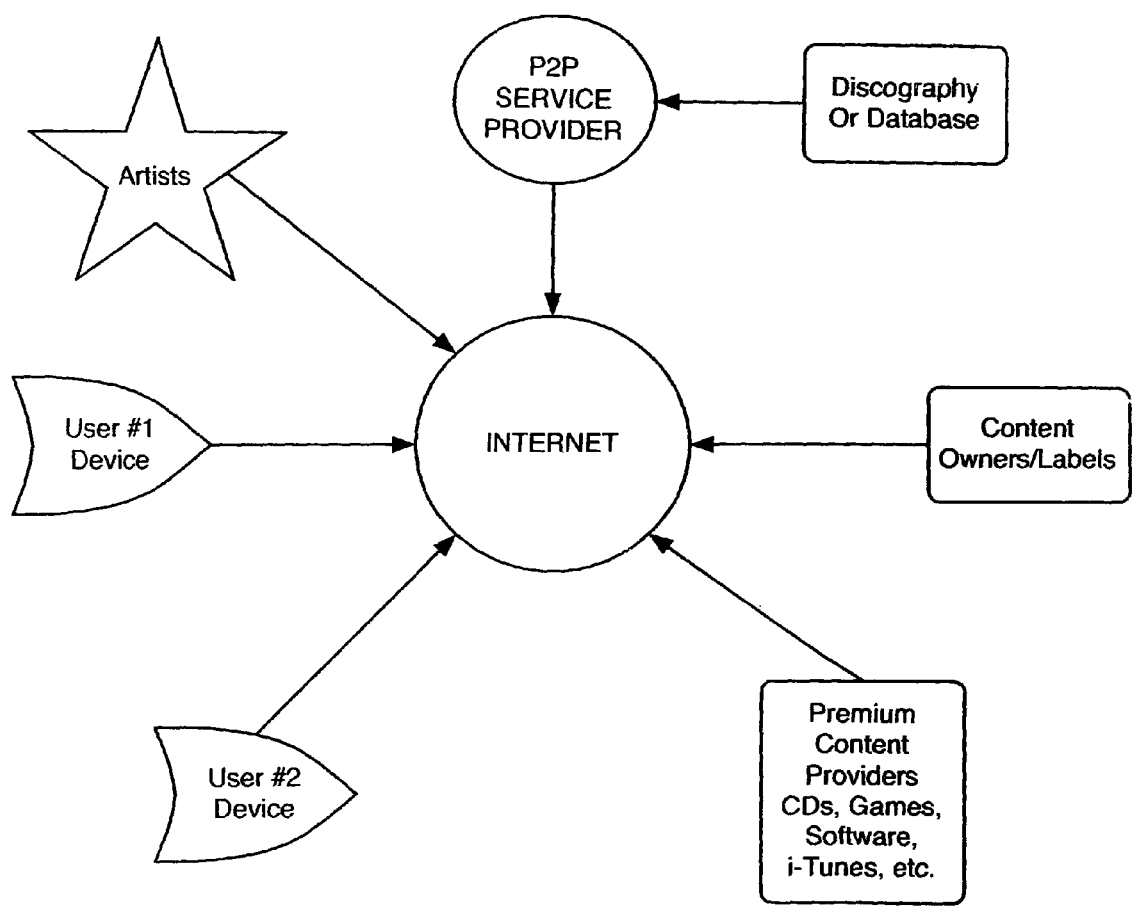
FIG. 1 is a block diagram of a file sharing system according to non-limiting example embodiments.

Various aspects, advantages and other features will become apparent in view of the following detailed description, which discloses non-limiting embodiments. In describing example embodiments, specific terminology is employed for the sake of clarity. However, the invention is not intended to be limited to this specific terminology. It is to be understood that each specific element includes all technical equivalents that operate in a similar manner to accomplish a similar purpose.

Example embodiments include methods of exchanging files and of regulating the legal exchange of files via a peer-to-peer network. Methods may include various incentive programs, which encourage users to continue downloading files, in exchange for credits that may be redeemed for future file downloads and/or merchandise purchases and/or cash. Example methods also compensate content providers and/or artists for each file exchanged, even where the file is a "free" file redeemed by a user using credits.

Example embodiments also provide systems that include a server coupled to a database, where the database may include information regarding files, such as whether the files are authorized and available from one or more members of a peer-to-peer network.

As used herein, "a" or "an" may mean one or more. As used herein, "another" may mean at least a second or more.

As used herein, the terms "artist" and "creator" are intended to encompass both the singular and plural forms, and include musicians, songwriters, authors, programmers, and the like. The artist or creator may or may not be the copyright holder or other content rights owner or an authorized licensor of the work. The terms "content owner," "rights owner," "copyright holder," "authorized licensor" are all used somewhat interchangeably herein to mean the person or organization that owns rights to the work and may be capable and authorized to provide a license or sublicense to the file. An authorized licensor or content owner may include for example a label company, software company, artist, etc. It should be noted however, that an artist is not necessarily an authorized licensor or content owner, and in many instances is not an authorized licensor or content owner, such as in the case where the artist has a recording contract and the label owns the copyrights and rights to distribute the work.

The term "files" as used herein is intended to include, but is not limited to any form of digital content now existing or that may later be developed, including, but not limited to files containing, music, movies, games, television programs, video games, videos, software, podcasts, advertisements, artwork, ring tones, literature, photos, and the like, even if in compressed or encrypted formats.

The terms "authorized files" and "legal files" are used interchangeably herein to mean files that may be legally shared via the file sharing systems and methods, which include the following: (1) any material that is not copyrighted (either formally registered via the U.S. copyright office, or by common law), or (2) any material for which one or more copyrights (formally registered or by common law) exist and the copyright owner has licensed the copyright to the peer-to-peer service provider. Authorized files may also be files for which permission is only granted for release or transfer after a certain date or within a certain time frame. Accordingly, the authorized licensor can control the timing of the release of certain files and/or removing certain files from further distribution. According to example methods in which authorized file become authorized as of a certain date (after the date the request is received), a user is not allowed to download the file until the date the file becomes authorized. Conversely, if files are authorized only up until a certain date, the file must be downloaded prior to that date.

The terms "virus protection software," and "virus software," are used interchangeably herein, and as these terms are used throughout this entire application, they are intended to include software capable of protecting against any malicious files (including malicious software), including, but not limited to, viruses, spyware, adware, spoof files, pornography, cuckoo eggs and the like. Virus software updates may be required for sharing files. They may not be required, however, to browse the discography and listen to samples or snippets of music, as these activities do not put others at risk of contracting any computer viruses from the user.

According to example embodiments, an authorized licensor, artist(s), content owners/label companies, premium content providers (such as providers of CDs, games, software, etc, a non-limiting example of which is itunes), copyright owner, and the like (which are not mutually exclusive), and/or one or more end users (i.e., users who upload and/or download files), all desiring to receive legal file sharing services and benefits, may register with a peer-to-peer service provider over a data communications network (such as, for example, the Internet). The registration process may create an account for each registering entity.

Accounts may be maintained and automatically updated by the P2P service provider with each file sharing transaction. For example, upon a transaction, the P2P service provider may collect and store data regarding the transaction (such as information regarding who the file was transferred from and to, the artist, the provider, the copyright holder, etc) and associate such data with the accounts of the end users, artist (s), content owner(s), and/or content provider(s), etc.

Upon registering with the P2P service provider, an account may be created for the end user and the end user becomes a member of the P2P service. User accounts may include information regarding a user's preferences for the displays when the user logs onto the P2P website, downloads, payment options (e.g., credit card number or paypal information), name, address, and the like. Accordingly, example methods and systems may have built in security measures to prevent hacking. Accounts may also be set up such that the user/member remains anonymous, for example, by using only an e-mail address and username to set up the account. In this situation, the user would not be able to order merchandise or redeem credit from an online store, as discussed further below, because the store would not have a name or address to which it would send the ordered items.

According to certain embodiments, end users may each have a device equipped with a P2P or like communications capability for sharing files with each other. Thus, two or more end user devices form a P2P or like network.

Accordingly, methods are included, which include one or more users registering with a peer-to-peer service provider over a data communications network, requesting at least one file from the peer-to-peer service provider, and if the file is authorized or licensed to the peer-to-peer service provider, downloading the file via the service provider.

Also included are methods that include receiving a request from a first user for at least one file; searching for a second user possessing a copy of the file; allowing the first user to download the file from the second user if a second user possessing a copy of the file is located; processing a debit of an account corresponding to the first user; processing a credit of an account corresponding to the second user, and processing a license fee to at least one authorized licensor or content owner. According to example embodiments, the credit processed to the second user may be redeemable for compensation, which may include merchandise or monetary compensation, but not redeemable for files; and processing a license fee to an authorized licensor. If a second user possessing a copy of the file is not identified, the method may include downloading a copy of the file from a premium content provider, rather than from a second user. Methods may include determining if the file is an authorized file from an authorized licensor.

Further included are methods that include receiving a request from a first user for at least one file; searching for a second user possessing a copy of the file; allowing the first user to download the file if the second user possessing a copy of the file is located; charging the first user (e.g., credits from an account or money) for the file; processing a credit of an account corresponding to the second user; and processing a license fee to at least one authorized licensor of the file and/or other content owner or artist associated with the file. Such methods may include at determining if the file is an authorized file from an authorized licensor.

These methods can be repeated with one or more first users until the second user has accumulated a plurality of credits, which can be redeemed for at least one file from a third user, or which can be redeemed for merchandise or other compensation.

According to example embodiments, transactions relating to any of the present methods may be conducted within a secure website, which does not require a user to download additional software to participate in the file sharing process. Thus, according to example embodiments, at least one of the charging and/or processing steps for example, is conducted within a secure website.

According to further example embodiments, the first user may request a file or search for a file by clicking on (which is meant to include any method of activating a dynamic link)

e.g., on a website, audio player, e-mail, etc. After the dynamic link is clicked on, a web site or software for example may be opened that conducts a search of a peer-to-peer network for the file identified in the link. Thus, example embodiments include methods where the request from the first user is received by the user clicking on a dynamic link.

Also included are methods that include receiving a request from a first user for at least one file; searching for a second user possessing a copy of the file; and determining if the downloading is a direct transaction or an indirect transaction. If the transaction is a direct transaction, the method includes charging the first user a fee for downloading the file, and compensating the second user with credit that may be redeemed for files or merchandise or other compensation. If the transaction is an indirect transaction, the method includes determining whether the first user has accumulated enough file credits to purchase the file, and if the first user has accumulated enough file credits, authorizing a download of said file and debiting an account associated with said first user for redeemed file credits, and compensating said second user with credit that may be redeemed for merchandise or other compensation, such as monetary compensation. According to example embodiments, the credit is not redeemable for files. These methods further include allowing said first user to download said file; and compensating at least one authorized licensor or content owner. These methods may include compensating at least one artist associated with the file. These methods may further include compensating the first user with credit.

Such methods may also include registering at least one of the first and second users over a data communications network. Methods may further include accessing a database to determine if the file is an authorized file, and searching the database for a second user or premium content provider possessing a copy of the file. Further modifications and features of methods in accordance with example embodiments are provided herein.

The P2P service provider may take the form of a server coupled to a database with information of the files available from the members of the P2P network (i.e., uploading/downloading end users), which information may be updated for example, after each transaction. According to these embodiments, the P2P service provider may monitor exchanges between the members of the network, and ensure that only authorized files, such as files that have been sold or licensed to the P2P service may be exchanged between end users. Alternatively, the P2P service provider may not be coupled with a database, but is otherwise capable of obtaining such information from the end user's device.

The P2P service provider may maintain one or more lists of all authorized licensors and the file(s) and transactions associated with such licensor. By keeping track of all transactions involving a particular artist or owned by a particular content owner, the P2P service provider may ensure compensation of the content owners/label companies and/or artists for any file sharing transactions.

Example embodiments include systems including a server coupled to a database; wherein the database includes information regarding files, which may or may not be authorized and may or may not be available from one or more members of a peer-to-peer network. The information may be updated upon a transaction in which one or more of the available files is exchanged between one or more members of the network. According to example systems, the server may be adapted to monitor exchanges between the members of the network, and adapted to control the exchanges such that only authorized files may be exchanged between end users. Such control may include for example, allowing files licensed to the peer-to-peer service provider and/or only files that free of malicious files to be exchanged between end users. Systems may further include computer devices associated with one or more authorized licensors of content and/or computer devices associated with one or more end users. The server may include software capable of providing a digital fingerprint for each file. The server may further be capable of scanning files for a digital imprint, as discussed further below. The server may also include software capable of monitoring for unauthorized files and/or detecting malicious files (including malicious software), such as viruses, cuckoo eggs, spyware, adware, pornography, spoof files, and the like.

Non-limiting example embodiments include systems that include a server coupled to a database; where the database includes information regarding available files from one or more members of a peer-to-peer network; where the server is adapted to monitor exchanges between the members of the network, and adapted to control the exchanges such that only authorized files (e.g., files licensed to the peer-to-peer network, files authorized by at least one content owner, those having no copyright, and those for which permission has been granted by a content owner) may be exchanged between end users; and where the server includes software capable of providing a digital fingerprint for each file, and capable of scanning files for a digital imprint.

According to example embodiments, the server may be further adapted to control exchanges, such as files tagged with information capable of identifying at least one prior owner of the file may only be exchanged between end users, when the file tag does not show a gap in ownership. According to example embodiments, the server may be adapted to provide incentives to end users for the exchange of files, except that when files are tagged with information capable of identifying at least one prior owner of the file, incentives are only provided for the exchange of files having a file tag that does not show a gap in ownership.

Systems may further include other aspects to implement the methods discussed herein. For example, systems may include those in which at least a portion of an exchange between users, is conducted within a secure website. Systems may also include those in which an exchange is requested by a user clicking on a dynamic link.

By way of non-limiting example, FIG. 1 is a block diagram of a file sharing system according to example embodiments. The system according to the embodiments depicted in FIG. 1 includes a peer-to-peer (P2P) service provider coupled to computer devices associated with one or more authorized licensors of content, artist(s), content owners/label companies, premium content providers, and at least one end user, over a data communications network. It should be understood that systems need not include all of the depicted computer devices.

FIG. 1 further includes a discography or other form of content database, which is the database coupled to the service provider's server. The discography contains information regarding other users' files to determine if a file sought by a user is authorized and available from another user and/or information regarding whether the file is authorized and available from a premium content provider.

A search engine may be used by users to match requests for a song or artist with available songs and artists. With an ever-expanding discography or other form of content database, a display of the discography may inform users of which files are authorized or licensed to the service and currently available from other members in the network, and which files are not. Licensed works may be listed for example, in bold black letters, while unlicensed works may be listed in red. It should be noted however, that any method of distinguishing licensed from unlicensed works may be used.

After a file is licensed, members can freely trade it on the service. As indicated above, only authorized files would be allowed to be shared between members. An example of a way to control file sharing to only authorized files is to use filtering technology to prevent unauthorized downloads. Such filtering technology may also allow content owners to control the timing of releases. If a requested file is not authorized for release in the system, the user may receive a message to that affect, and may be sent a request form for them to pre-order the file for when it becomes available, particularly if it is expected that file will be authorized or released in the future.

The discography or other form of content database software display may list for example, the band name, song title, album, label, release date and other identifying features. Which information is listed and the order in which it is listed may appear in a default format or may be chosen by the user. For example, a user may choose to view the band name first and then the song title, but not want the album or any other information listed on his or her display, so as to allow room for the longer song titles to be fully displayed. The discography display may include a "Sort Feature" allows members to organize by first and last names, song title, album title, label, etc. In the case of movies, for example, a user may wish to view only the movie title, stars, and year of release. The sort feature would allow the user to sort movies by a biography database of their favorite actor. Accordingly, example embodiments include allowing a user to sort various criteria of files before requesting at least one file. This feature is also useful for the user's personal database management. For example, after the user downloads and/or uploads more than one file such that the first user has a database of at least two files, the user may sort the database by any number of criteria. A non-limiting example of a screen shot of various features that may be sorted is depicted in FIG. 16.

The discography software may also display the digital formats, such as AAC, Wave or MP3, so they are visible to the downloader and the downloader can choose which format they would like to download. In addition, file resolution and/or size may be displayed, and it may be necessary to require a minimum level of quality to be eligible for transfer.

The search engine may also include a request feature, which allows consumers to request licensing for unlicensed files from the database. Those requests may be forwarded to the artist, manager, publisher and label, for example periodically (e.g., monthly) or upon receiving a certain number of requests for licensing, to encourage them to participate in the service. Accordingly, if a file being requested is not yet licensed or authorized, then example methods include allowing the requesting user to submit a request that the file become authorized.

According to certain embodiments, users may be offered free entry to view the database, such that they can browse the discography for available files. When the consumer finds what they are looking for in the discography, they can listen to a stand-alone stream of music or video to sample it before purchasing. This stream may contain for example, a 30 second sound or video snippet (or even shorter for example, in the case of ring tones), which requires no licensing fees. After registering as a member, users may buy ala Carte as they wish. No monthly fees or cover charge is required for this type of membership. Accordingly, example methods may include allowing a user to access a sample of a file before or after registering as a member.

Alternatively, members can pay a monthly subscription fee to hear the entire songs, video, movie, etc. through a premium "Streaming Subscription." A built in jukebox may be provided or one may be licensed from another company such as i-tunes, musicmatch, etc. According to these embodiments, example methods may include allowing a user to access an entire file after registering as a streaming subscription member.

If a user is interested in buying a song or other file, they can choose to purchase and download a file either directly from a content provider, such as a premium content provider, or by searching the P2P service for matching titles on other uploading shared folder hard drives. A program called "Geo-coding" may speed downloads and reduce bandwidth costs by matching searches by the member requesting a file to one of the geographically closest members having the file being searched for. Accordingly, example methods may further include selecting an uploading user/member based on proximity to the requesting user.

One method for determining geographic proximity may be for example by zip code. According to these embodiments members would provide information, for example upon registering for membership regarding their geographic location, such as zip code. The member's location is then associated with their membership such that the database is not only searched for a matched file to the search query, but is further searched to determine which other user(s)/member(s) having the matched file is geographically closest to the requesting member. Alternatively, a downloading member may enter an alternate zip code indicating their location at the time of the download, for example if the member is traveling and away from the location at which they initially registered. Another method in determining proximity may be by member IP address. It should be understood that according to these embodiments, the user/member providing the file need not be the exact closest member having the file, but may be closer than other members capable of providing the file, as closer proximity may speed the transaction.

To encourage "uploading" members to share their collections of files (such as MP3, .wav, .aaf or any other format of file), according to certain embodiments there may be no obligation to purchase any files. For example, if the user wishes to remain anonymous, they may do so by not purchasing any files directly, but by uploading files and waiting until other members download enough of the member's songs such that they have enough credits to "create an account" or to obtain files using credits. Anonymous users may not be able to redeem credits for merchandise, however, because the user may have to be identified to receive shipments. The user may be limited to only "browsing" until other members download songs and the member accumulates credits. This creates traffic and loyalty rather than a "roadblock" that may turn some potential members off when they are asked to pay money to create an account.

Users may also remain anonymous by purchasing a pre-paid card or gift card that may allow them to download songs without providing any personal information.

According to certain embodiments, members may be required to update their virus protection software each time they log onto the P2P network, or at certain time intervals (e.g., each week, or at the first log in each day, week, month, etc.) A method of implementing this requirement may be to scan each member's hard drive for current virus protection and require them to update it (if it is not currently up to date) before allowing them on the network. If the user does not have virus software on their computer, or if they desire different software, the P2P network may present software, or present links to software for virus protection.

Example file sharing methods include determining whether at least one of the users has updated virus software before allowing a user to download a file. Thus, example embodiments may include e.g., receiving a request from a first user for at least one file; searching for a second user possessing a copy of the file; requiring the first user and/or the second user to have updated virus protection software (for detecting malicious files); and allowing the first user to download the file.

If a malicious file or other problem is detected, either or both of the downloader and uploader may be notified, so they can delete the file, run virus protection programs, and the like to try to prevent further damage to their own computer systems or to others' systems. Accordingly, example methods may further include scanning a file for viruses and/or other malicious files and/or informing users of any detected viruses, for example before allowing a user to download the file. Example methods may include using monitoring software to help ensure that the requester is receiving the song, movie, game or whatever file they have requested without any unnecessary spyware or adware. The filtering software can also detect other malicious files, such as a virus, spyware, pornography, cuckoo eggs, etc. Because the recording industry would approve of the service, they don't have to plant spoof files.

Because users are made aware through the P2P network that they cannot trade a polluted file, and therefore cannot earn any credits or points for sharing such a file, the user has added incentive to offer/upload only "clean" files to the service.

Example methods may also include scanning the file for a digital imprint or "fingerprint" associated with the file, which may aid in controlling the release of files. Software may be used to provide the digital imprint or fingerprint. With this system, the mathematical algorithm of the file may be placed in a catalog that contains a discography of an ever-expanding vault of music and other files. When the software finds a title with a similar name to a request, it may identify the digital fingerprint of the file and match it against the song in the discography. If the songs match, the software will either change the title of the song on a user's drive to the correct title, or send them an automatic E-mail telling them the correct name and encouraging them to correct the titles in their collections to increase the odds of finding buyers for their songs.

Accordingly, certain example embodiments may include an "Auto ID Feature", which reads a file (e.g., the digital fingerprint) that may not be listed accurately on a user's hard drive, CD or CD-R, and matches it to the fingerprint of files in the discography, then renames the song or file with the correct title automatically. This may be referred to as an "auto name" or "auto ID" feature. When a user logs onto the system, the software could scan the files in their "shared" folder. If the names are incorrect, the service may prompt them to correct the titles. The software and/or the P2P website may inform users that incorrect titles cannot be transferred and will prevent the user from earning points.

According to certain embodiments, a tag or extension may be added to each file as it is transferred through a peer to peer system to identify information associated with the file, including but not limited to, author, artist title, content owner(s), release date, digital fingerprint, authorization, the original source, a history of ownership (e.g., at least one prior owner of the file), genre, and the like. Example methods may include scanning one or more files and verifying that the digital fingerprint in fact matches at a minimum the artist and title. The method may further include verifying that the file does not contain any malicious files. Files containing malicious files (including malicious software) may be filtered out and/or blocked from the peer-to-peer system. When reference is made herein to a "tagged file," that may include both previously tagged files and files tagged during that particular transaction.

A file whose tag(s) show a gap in ownership may indicate that licensors or other content owners or artists may not have been compensated for at least one transfer. According to example embodiments, a user may be prohibited from downloading a file if the file has a tag showing a gap in ownership, where the file had been transferred without a content owner being compensated. Incentives may or may not apply when a user trades files obtained using the present methods outside the system. Thus, a user(s) may be disqualified from receiving credits for files showing a gap in ownership. According to example embodiments, files stripped of the watermark or having invalid account information do not qualify for incentive credits or points and can only be traded by the owner of the file. According to further example embodiments, if a user attempts to trade a file with a gap in ownership, the file must be purchased for the user to qualify for incentives.

Example methods include receiving a request from a first user for at least one file; searching for a second user possessing a copy of the file; allowing the first user to download from a second user a copy of the file; charging the first user debits from an account corresponding to the first user, or charging the first user money for the file; processing a credit of an account corresponding to the second user; and processing a license fee to at least one content owner of the file and/or authorized licensor or artist associated with the file. According to example embodiments, the file may be tagged with information capable of identifying at least one prior owner of the file, and one or more of the users is disqualified from receiving credits for files having a tag showing a gap in ownership.

Certain example embodiments may include incentive programs, which may have several advantages. According to certain embodiments of incentive programs, members may be able to accumulate "credits" or "points" that may be redeemed for CDs, music related merchandise, more files, and the like. For example, they may allow members to earn "free music" or "free games," etc., which is advantageous to the P2P service provider from a marketing standpoint, and is advantageous to the end user in that they end up paying less for each file or for merchandise than they might otherwise pay. Another advantage of the present incentive programs is that the artist, content owner, or other licensor, would be compensated for an upload or download, despite the characterization of the file to the end user as being "free." A further advantage of the present incentive programs, is that by compensating members with "credits" rather than dollars, many interstate and intercontinental tax issues do not come into play. Accordingly, example embodiments are further directed to fee-based peer to peer systems, which compensate the licensors of content, but have certain transactions with no transaction fees (e.g., when credits are being redeemed for files, there are no credit card fees, paypal fees, and the like). Also encompassed are file sharing methods that include receiving a request from a first user for at least one file, determining if the file is an authorized file from an authorized licensor, searching for a second user possessing a copy of the file, allowing the first user to download the file from a second user if the file is authorized, and processing a license fee to the authorized licensor, wherein the method includes no transaction fees.

By way of non-limiting example of an incentive program in accordance with example embodiments, a credit system may be implemented with different levels of credits that may be redeemable in different ways depending on how they were earned. Silver credits for example, may be earned in two different ways: (1) members earn one silver credit for every 10 files they buy; or (2) members earn one silver credit when another member purchases a file from their hard drive. Silver credits may be used to purchase merchandise from an online store. When enough silver credits have been accumulated, members can purchase file downloads from the P2P network. For example, according to certain embodiments, two silver credits may be used to purchase one music file.

Gold credits may be redeemed for file downloads, or for merchandise from the online store. Because each file may have a different price or value, the number of credits needed to earn a download may vary. A certain number of silver credits (e.g., two silver credits) may equal one gold credit.

Blue credits (otherwise referred to herein as "store credit") can be accumulated to purchase merchandise from an online store. Blue credits are received by a first member when a second member redeems previously earned credits to download a song from the first member's hard drive. Because there is no direct purchase generated from this transaction to compensate the content owner of the song that was redeemed from the first member's computer, Blue credits are store credit only and may not be exchanged for silver or gold credits or used to redeem files from others.

In summary, gold or silver credits may be redeemed for files or used as store credit. But the reverse is not true. Blue credits (or store credit) may not be exchanged for gold or silver credits or otherwise redeemed for files.

Merchandise in the online store may include any product, including, but not limited to, CDs, t-shirts, concert tickets, movie vouchers, phones, subscriptions (such as magazine or satellite radio subscriptions), and MP3 players, and the like. The online store may be a separate entity, or alternatively a storefront where partnerships are formed with companies such as Amazon, Best Buy, Borders Books, Ticketmaster Bamzu, AOL and others. Where the online store is a storefront, the storefront would serve as a link through conduit to any website that is set up for payment. Software may be used to measure and detect the click-through, and may be used to include a payment method that converts the retail price of the item being purchased into P2P credits (where applicable). Where credits are being used in such a storefront, the online retailer is a partner with the P2P provider and would collect payment from the P2P provider depending on the number of credits used.

Members can also purchase merchandise from the online store directly for cash rather than using credits. The redeeming or purchasing member is responsible for any applicable taxes, shipping and handling charges on items redeemed from the Online Store. Store credit may generate additional profits in that it may encourage members to purchase items that cost more than the amount of store credit they have, or to purchase additional items that they might not have found had they not been encouraged by the store credits to enter the online store. Merchandise may also be paid for using more than one method, for example by using a certain number of credits and paying the difference using a credit card, paypal, debiting a gift card, or by other method. If members do not redeem any or all of their store or file credits the unredeemed credits remain as revenue to the P2P provider.

Targeted advertising may appear on webpages for a specific demographic or psychographic the manufacturer is trying to reach. For example, NIKE AIR may want to reach listeners of hip-hop music. Accordingly, NIKE AIR advertising, links to NIKE AIR products in the online store, links to the NIKE website, and the like may appear on a page accessed by a user who has previously downloaded hip-hop music. For example, a banner ad may read—"Nike Airs—only 175 credits—click here to redeem." NIKE may then either pay for such advertising, advertising may be part of a partnership arrangement and/or the P2P provider may benefit simply by increased sales from the on-line store. Unlike traditional advertising, these banners may not pop up and block a user's activities, but may be displayed in a manner that is welcome by the user in that it suggests how the user can redeem their credits and receive merchandise "for free". Accordingly, in methods of example embodiments, at least one of the first and second users may be provided with targeted advertising based on, for example, prior file downloads, the user's registration profile (such as membership information input by the member), and/or merchandise redemptions.

Various types and amounts of credits may also be awarded for achieving a certain level of activity in a user's account. Credits may also be awarded for simply setting up an account, or setting up an account in a manner that keeps transaction fees to a minimum for the P2P service, for example, by the member setting up their account such that charges go to a PayPal or Bitpass escrow account with a minimum balance.

It should be understood that the names of the credits and the ways in which they may be earned and/or redeemed may vary in accordance with example embodiments, so long as the goals are met, i.e., of providing incentives to keep users returning to the network, while fairly compensating content owners and others.

It is also contemplated that a cash back incentive program might be implemented rather than credits (or cash in exchange for earned credits). However, such embodiments may raise issues regarding which currency to use, as users on the world wide web might be in a variety of countries. Also exchange rate issues may arise and possible tax considerations may arise.

According to certain example embodiments, revenue from each file purchase may be divided as follows, 50% to the content owner/label company, 2% artist bonus, 24% is returned in the way of member incentives, and 24% to the file sharing service. It should be recognized that the percentages and division of income may be adjusted and varied in accordance with example embodiments.

The 2% artist bonus is optional and may be paid directly to the composers and recording artists for each file that is downloaded. This is independent of any money that the artist receives from the content owner, for example through their recording contracts. Deductions allowed from this payment may be from the artist's management company, or the artist's rights organization such as ASCAP, BMI, and SECAC collecting the fees with an accounting record going to their business manager. The artist who created the work for sale may be the artist who is directly compensated and then he or she is responsible for compensating any other songwriters, owners of samples, etc.

Certain example embodiments may include a "two for one" swap. According to these embodiments when two paid files are uploaded in exchange for one "free" file to the uploading member, there are three files being shared and therefore three licenses to be paid out. That is, there are two paid files purchased by the downloaders, and in exchange, one free file (or credit) goes to the uploader. The difference is divided between all participants with 25% of the total of the two purchases going towards the incentive file that is compensated to the uploading "member". There is also now a 3% of the total revenue generated from the two purchases paid out as a direct Artist Bonus because three artists are being compensated. Therefore, revenue generated by the two paid files may be divided for example, as follows: 25% to content owner 1, 25% to content owner 2, 25% to content owner 3, 3% artist bonus, and 22% to the file sharing service. From a monetary standpoint, by way of example if each download generates 50 cents in revenue, each two for one swap generates $1. According to this example, each of the three content owners may receive 25 cents, each of the three artists receives 1 cent (2% of a 50 cent download), and the file sharing service receives the remaining 22 cents. As with the previous embodiments, it should be recognized that the percentages and division of income may be adjusted and varied.

Although the present application and examples have estimated the current value of an uncompressed MP3 file at about 50 cents each, an artist or content provider may set a higher rate based on the demand they perceive for their file. For example, a highly anticipated release may be priced at $1.50 depending on the market. Accordingly, in the methods of example embodiments, the P2P provider may offer a "flexible pricing" option for the content owners to take advantage of.

The "flexible pricing" options may allow artists and labels to sell their songs at various rates, such as in even denominations to allow simplified sharing. For example, the content owner may choose between three different price tags for files. By way of non-limiting example, songs that are currently charting in the Billboard Top 200 Album charts or the Top 40 of the Media base, R&R or Billboard Monitor charts could be sold at $1.50. New releases (e.g., within the last 6 months) may be sold for $1 and all other catalog songs may be sold for 50 cents. It should be recognized that these values are only current estimates based on the current market. Of course, the amount charged may be modified depending on the market. If a label or artist chooses to sell their song at a higher rate than the default catalog rate, the content owner may receive a higher amount of money for each transaction, for example, they may still receive 50% of the purchase price, which may be 75 cents, rather than 25 cents.

According to certain embodiments utilizing flexible pricing plan, the file, such as, song files, DVD files, ring tones, and the like may each have a separate prices depending on various factors, such as the price the artist or label wishes to put on the file, or the newness or popularity of the file. According to certain embodiments, each available price of the flexible pricing plan, has a common denominator, which may be the common fee for most files, for ease in determining incentives available from each purchase and for determining the amount of incentive points or credits that would be required to redeem a file that having a greater price. Files for which a greater fee is charged may be a multiple of the common fee. For example, if the common fee is 50 cents for a file, the fee for a more popular file may be $1.

As indicated above, certain types of points or credits may be redeemed for merchandise. The profit margin for these transactions may vary and may be higher than in a swap for downloads. Because only two files are being shared in exchange for merchandise in this transaction, there are only two licenses and two artists to be paid. Although the average profit may be approximately the same as the exchange for MP3s, there is a potential for greater revenue when members exchange credits for merchandise rather than files.

The cost to the P2P provider of a gold credit (also known as a "file credit") would be calculated by adding the license fee (e.g., 50% or 25 cents in the above example), the artist bonus (e.g., 2% or 1 cent in the above example), and a 3 to 7 cent incentive cost to compensate the member providing the file. A silver or "half" credit may cost the file sharing service between 14½ and 16½ cents, and can cost less if it is redeemed for merchandise rather than files, due to the elimination of additional license fees involved.

The numbers may change depending on various factors including the charged price per download, the agreed-to percentage for license fees or bonuses, and the type of transaction taking place. For example, the cost may be different in the case of a "two-for-one" or "three-for-one" swap.

Accordingly, example embodiments include the following methods (an example of which is illustrated in Example 1, below), as well as computer code and devices for performing the method. Methods may include receiving a search query from User 1 operating a first end user device; searching a database for a match to the search query; if there is at least one match, displaying one or more files available from at least one other user or premium services matching the query; and receiving a selection of a particular file, File A, located in a second end user device associated with User 2, or in a premium database. It is then determined whether the downloading is a direct transaction or an indirect transaction. For example, User 1 may decide whether or not they want to use currency or credits (if they have enough of the right type of credits) to purchase the file. Alternatively, the program or the system may automatically determine whether currency will be required (direct transaction) or if credits will be used (indirect transaction), for example, if User 1 had previously indicated a preference to always use credits if available. If the transaction is a direct transaction, the method includes charging User 1 a monetary amount for downloading File A. If the transaction for downloading File A is an indirect transaction, the method includes determining whether User 1 has accumulated enough file credits to purchase file A, and if User 1 has accumulated enough file credits, the download is authorized, and User 1's account is debited for the redeemed file credits. Methods may further include compensating User 2 with credit, where the amount and type of credit may vary depending on for example the type of file User 2 provided (e.g., movie, book, music, etc) and/or whether the transaction was direct or indirect. Example methods may also include compensating at least one of the content owner, label company, copyright owner and the artist(s).

Example methods may also include receiving a request from a first user for at least one file; searching for a second user possessing a copy of the file; determining if the downloading is a direct transaction or an indirect transaction; allowing the first user to download the file; and compensating at least one of the authorized licensor and an artist. If the transaction is a direct transaction, the method may further include charging the first user a fee for downloading the file, and compensating the second user with credit that may be redeemed for files or merchandise. If the transaction is an indirect transaction, the method may further include determining whether the first user has accumulated enough file credits to purchase the file, and if the first user has accumulated enough file credits, authorizing a download of the file and debiting an account associated with the first user for redeemed file credits, and compensating the second user with credit that may be redeemed for merchandise but not for files. Methods may also include determining if the file is an authorized file from an authorized licensor.

As indicated above, direct transactions are transactions involving "direct" payment (e.g., by credit card, bank account transfer, paypal, and the like) from users in exchange for files. Transactions may be paid for after each transaction, after a certain number or dollar value worth of purchases, after a certain time interval (e.g., weekly or monthly), or in advance (e.g., by a pre-purchased gift card). When a file is purchased, the downloading member pays for example, 50 cents "directly" to the service. According to certain embodiments, currency may be used to pre-pay for a certain number of transactions. For example, pre-purchased gift cards may be advantageous not just in the situation where one desires to purchase a gift of files for another person, but also in the situation where one does not have a credit card or paypal account, such as minors. Alternatively, a person, such as a parent, may prepay by credit card or paypal for a certain number of transactions, or a certain number of transactions per month. Pre-paid transactions would still be considered direct transactions because currency is being used to pay for the transaction, rather than earned credits.

The methodologies discussed herein can be embodied on a machine-readable medium. Such a machine-readable medium can include code segments embodied thereon that, when read by a machine, cause the machine to perform the methodologies described herein.

Example embodiments may also include computer readable program products, which include a computer readable medium and a program for performing the various methods and functions described herein.

The following examples illustrate specific example embodiments. The examples set forth herein are meant to be illustrative and should not in any way serve to limit the scope of the claims. As would be apparent to skilled artisans, various changes and modifications are possible and are contemplated within the scope of the application, and may be made by persons skilled in the art without departure from the spirit of the invention.

EXAMPLES

Example 1

Figure 2:
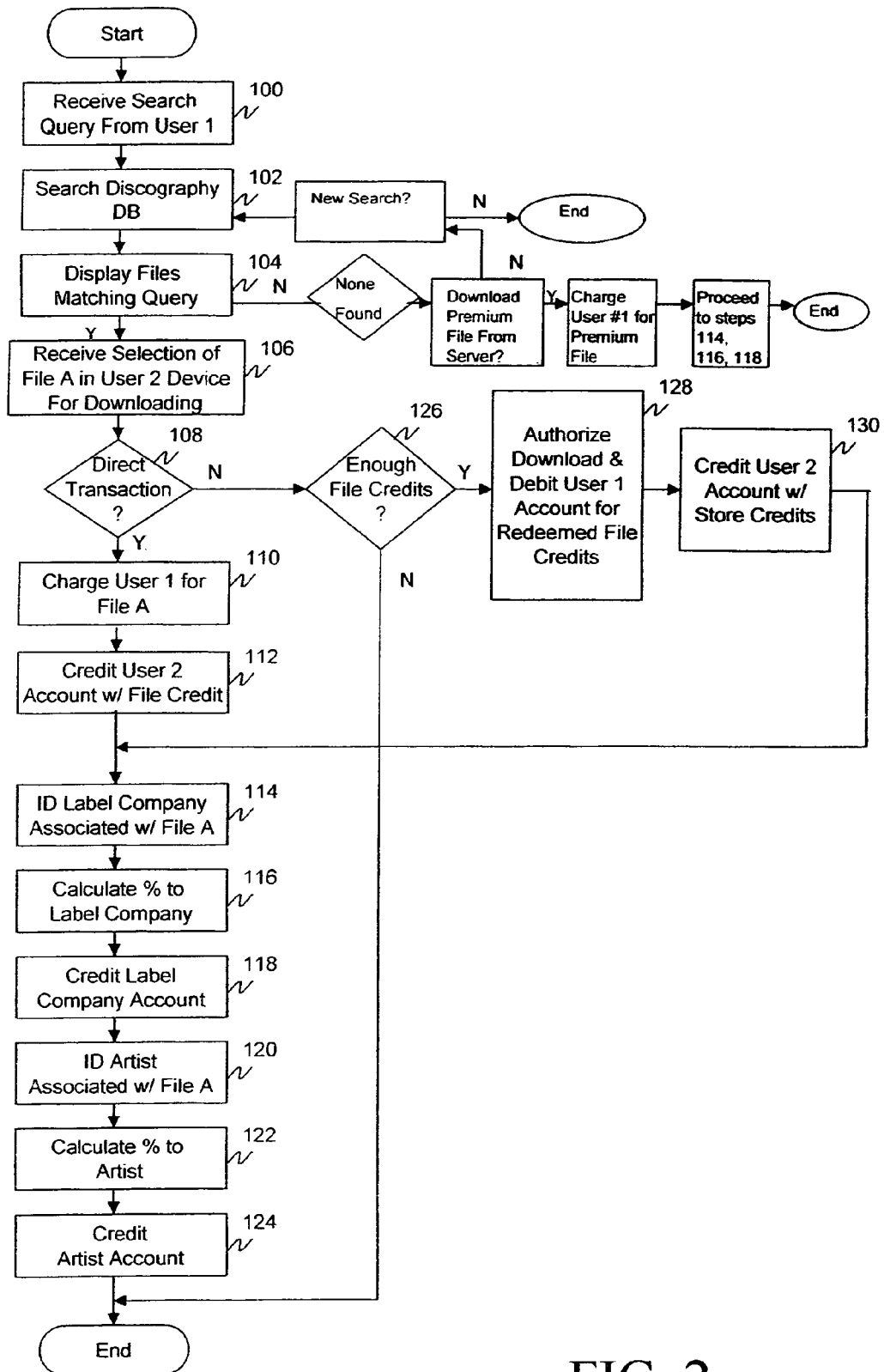
FIG. 2 is a flow diagram of an incentive program offered by a P2P service provider according to non-limiting example embodiments.

FIG. 2 is a flow diagram of an incentive program offered by the P2P service provider according to certain example embodiments. The incentive program may be implemented as a software program run by a processor included in the P2P service provider code according to corresponding program instructions stored in its local memory.

In step 100, the P2P service provider server (P2P server) receives a search query from User 1 operating a first end user device. In step 102, the server searches its discography database for a match to the search query. If there is at least one match, in step 104, the server displays one or more files available from other members or premium services matching the query. In step 106, the server receives selection of a particular file, File A, located in a second end user device associated with User 2, or in the premium database, if none is found for downloading from a second end user device.

In step 108, a determination is made as to whether the downloading is a direct transaction or an indirect transaction. If the transaction is a direct transaction, then the user is to pay a monetary amount for the downloading of File A. The server thus proceeds, in step 110, to charge User 1 a monetary amount (Dollar, Euro, etc.) for the downloading of File A. By way of example, a price point of 50 cents may be chosen (because 50 cents is approximately half the charge of popular free, unauthorized, and emerging digital download sites selling files for 99 cents). The server may automatically run a purchasing routine where User 1 is asked a series of questions, including questions for effectuating payment for the downloading of the file, such as for example, credit card information, bank account information, or the like. The User may also have the option of selecting how they would like to pay for the file, for example, with a credit card, paypal, debiting a gift card, deducting credits from the user's account and the like. Information regarding a user's payment accounts or methods and payment preference may be stored on the server. For example, User 1's account information may include credit card information, bank account information and the like, such that purchases may be one-click type purchases.

In step 112, the server compensates User 2 with a credit, (which may be referred to for example, as a silver credit), for providing File A to User 1. This may be done, for example, by retrieving User 2's account information and increasing the user's credits by e.g., one (although any unit of measure may be used in accordance with example embodiments). Credits may be used to purchase at least one file, or a portion thereof, at a later time.

In steps 114-124, the server proceeds to compensate the content owner/label company, and/or artist (if different than the owner), and the like, associated with File A. In this regard, in step 114, the server identifies the label company (if any) associated with File A. In step 116, the server calculates a predetermined fixed amount or percentage, such as, for example, 50%, of the purchase price paid by User 1. In step 118, the server credits the content owner/label company's account that is maintained by the server, with the calculated amount.

In step 120, the server identifies the artist associated with File A. In step 122, the server calculates a predetermined fixed amount or percentage, such as, for example, 2%, of the purchase price paid by User 1. In step 124, the server credits the artist's account that is maintained by the server, with the calculated amount.

It should be understood that similar steps may be repeated with additional parties for whom the P2P network provider decides or contracts to give an amount or percentage or money associated with particular transactions. It should also be understood that it may not be necessary to compensate the artist and/or the content owner, depending on what agreement is worked out with each of them and/or other authorized licensor.

Referring to step 108, if the transaction for downloading File A is not a direct purchase transaction, then it is deemed to be an indirect transaction where User 1 seeks to redeem his or her file credits for the download of File A. Thus, in step 126, a determination is made as to whether User 1 has accumulated enough file credits by examining User 1's account. If User 1 has accumulated enough file credits of the right type (certain types of credits may not be redeemable for downloads), the download is authorized in step 128, and User 1's account is debited for the redeemed file credits.

In step 130, the server then compensates User 2 with a store credit, (which may be referred to for example, as a blue credit), for providing File A to User 1. This may be done, for example, by retrieving User 2's account information and increasing the user's store credits by one (although any unit of measure may be used in accordance with example embodiments). Blue credits (which are similar to silver credits but may not be redeemed for other files because that does not provide any way of compensating the content owner, musician and the like) may be used for store credit. According to certain embodiments, no distinction is made between store credits given for providing File A to User 1, regardless of whether the transaction is direct or indirect, but a distinction may be made with respect to downloading files.

Example 2

Figure 3:
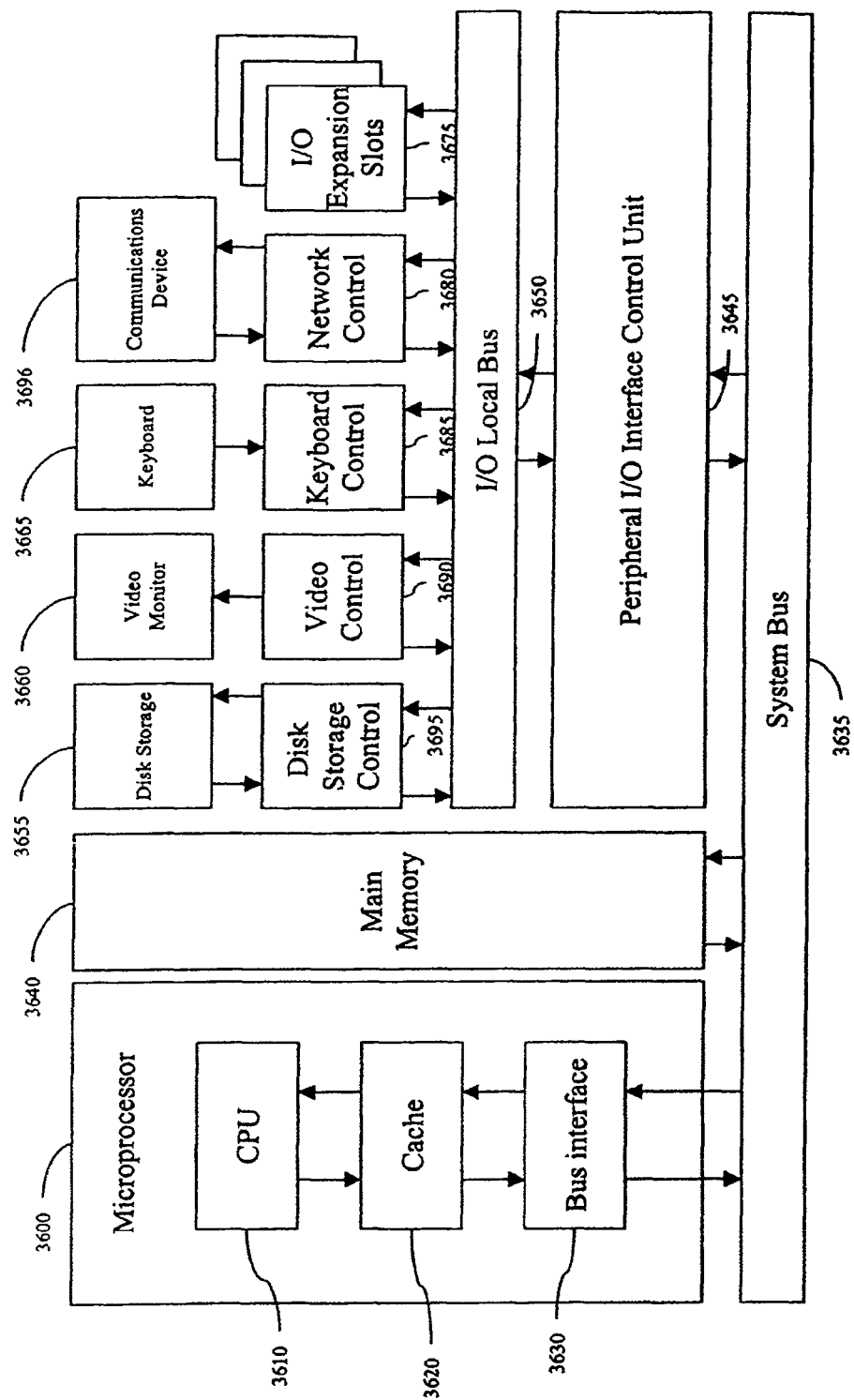
FIG. 3 is an architecture diagram of a data processing system suitable as a host for a P2P server in accordance with non-limiting example embodiments.

FIG. 3 is an architecture diagram of a data processing system suitable as a host for a P2P server in accordance with certain example embodiments. The data processing system includes a processor 3600 having a central processing unit (CPU) 3610, a memory cache 3620, and a bus interface 3630 operatively coupled via a system bus 3635 to a main memory 3640 and an I/O control unit 3645. The I/O control unit 3645 is operatively coupled via an I/O local bus 3650 to a storage controller 3695, a video controller 3690, a keyboard controller 3685, a network controller 3680, and an I/O device controller 3675.

The storage controller 3695 is operatively coupled to a storage device 3655. Computer program instructions for implementing the P2P server, which may include for example, a "two for one" incentive program are stored on the storage device until the processor retrieves the computer program instructions and stores them in the main memory. The processor then executes the computer program instructions stored in the main memory to implement the features of the P2P server as described herein.

A video controller 3690 may be operatively coupled to an electronic display device (e.g., a video monitor 3660) for display of a user interface for the P2P server. The keyboard controller 3685 is operably coupled to a keyboard 3665 for input of user commands to the P2P server.

A network controller 3680 may be operatively coupled to a communications device 3696. The communications device may be adapted to allow a P2P server hosted by the data processing system to communicate via a computer network such as the Internet with other computer devices on the computer network as described herein.

Example 3

Figure 4:
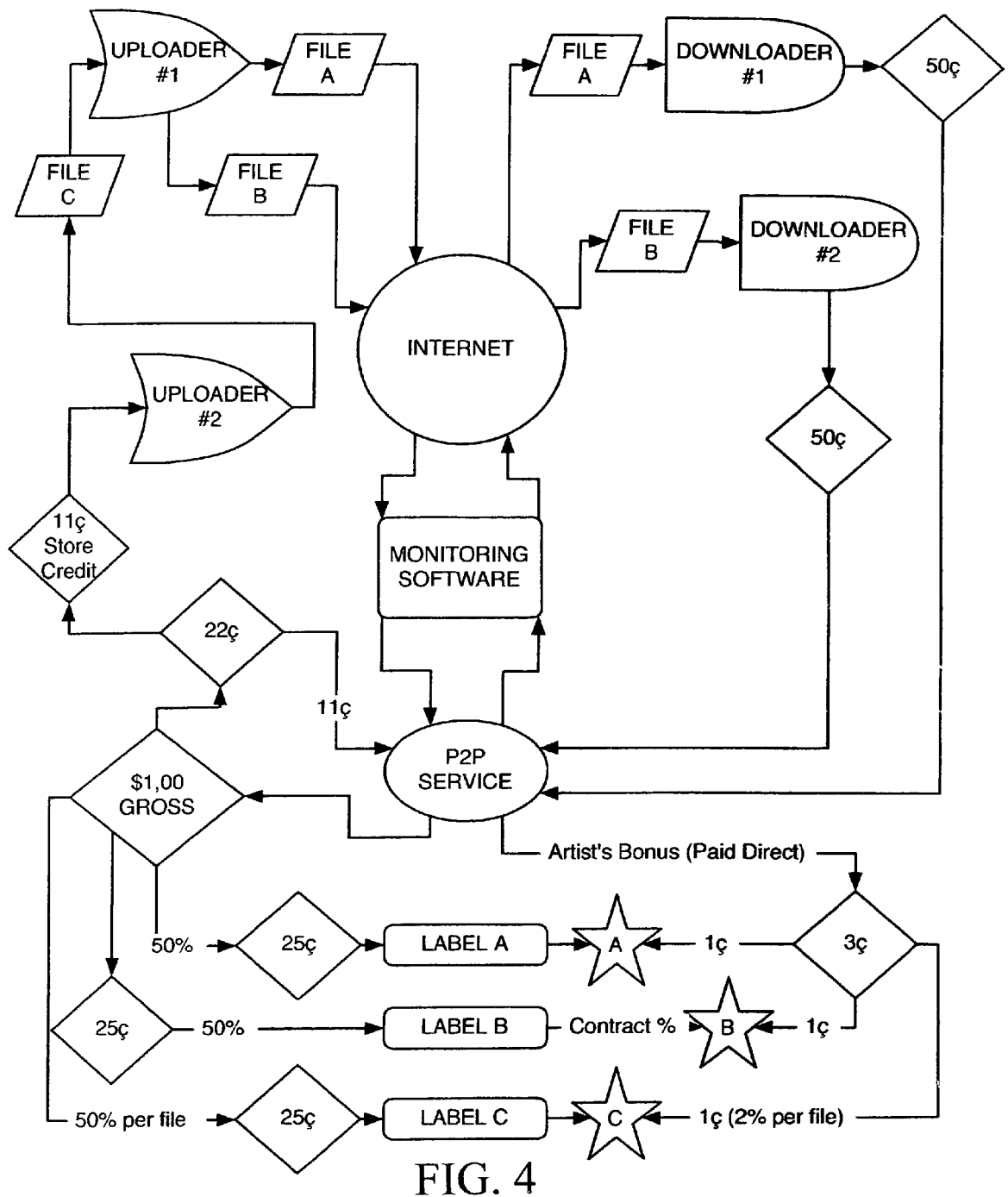
FIG. 4 is a flow diagram of an incentive program such as a "two for one" incentive program offered by a P2P service provider according to non-limiting example embodiments.

FIG. 4 depicts a flow diagram of a "two-for-one" incentive program offered by the P2P service provider according to certain example embodiments. The incentive program may be implemented as a software program run by a processor included in the P2P service provider code according to corresponding program instructions stored in its local memory.

According to this method, after Uploader #1 logs onto the monitored file sharing community (the Monitored P2P Network), and his or her virus software is checked for the latest update, his or her "shared folder" is opened to the network for trading. Next Downloaders #1 and #2 (who may be the same or different members) each finds a file on Uploader #1's hard drive through their search that they wish to purchase. Each makes a payment (e.g., 50 cents) to the P2P service for Files A and B, creating $1.00 gross. These are direct transactions. The content owners of Files A and B, e.g., music Labels A and B are then compensated 50% of each purchase (25 cents each). A portion of this compensation may be used to compensate any artists associated with the files, but that is governed by the agreement between the content owner and the artists.

Uploader 1 may then receive a "file credit" or a "gold credit" for the direct transactions in which Uploader 1 provided two files purchased by Downloaders #1 and #2. Uploader #1 can then redeem this file credit for merchandise from the Online store. Or, as depicted in FIG. 4, the credit may be used to redeem a File C from Uploader #2 (an indirect transaction). A licensing fee of 25 cents is now due to Label C as the content owner of File C. This leaves a 25 cent gross revenue for the P2P service. From this amount, the 2% Artists Bonus may now be paid directly from the P2P service to Artists A, B, and C (and/or to the Artist's Rights Organization) who receive 1 cent each.

From the remaining 22 cents shown on FIG. 4, Uploader #2 receives 50% (in this example, 11 cents) in the form of Store Credit (which may also be referred to as a "blue credit") for uploading File C to Uploader #1 who provided files to members paying "directly" in cash. Store Credit may only be used to purchase merchandise and cannot be used towards the purchase of a file. The cost of licensing the music from content owners may make compensation with file credits at this second level (in which Uploader #1 is redeeming credits through an indirect transaction to upload a file) cost prohibitive. Store credits can be redeemed for merchandise through the service's Online Store. The cost of a Store Credit to the company ranges from 3 to 7 cents, but the member redeems it for 11 cents generating a gross revenue of 4 to 8 cents.

It is contemplated that a new level of credit may be provided in lieu of store credit or in exchange for a certain number of store credits, in which Uploaders may be awarded credit for indirect transactions that may be redeemable for files—but many more such credits must be earned before a file may be purchased, so the content owner in this secondary indirect transaction may be compensated. A system may be set up in which for example, 10 credits awarded for indirect transactions may be redeemed for a file. Such a system may eventually break down from a financial or marketing standpoint. Users may not appreciate or be motivated by receiving smaller and smaller partial credits for uploads.

In this example, after Uploader #2 is compensated with one Store Credit, the P2P Service Provider realizes a gross revenue of 11 cents from both transactions. The member's incentive ranges from approximately 10% per file where they earn a Store Credit in an indirect transaction up to 25% per file when they earn a Silver Credit in a direct transaction, or more depending on the type of credit.

Figure 5:
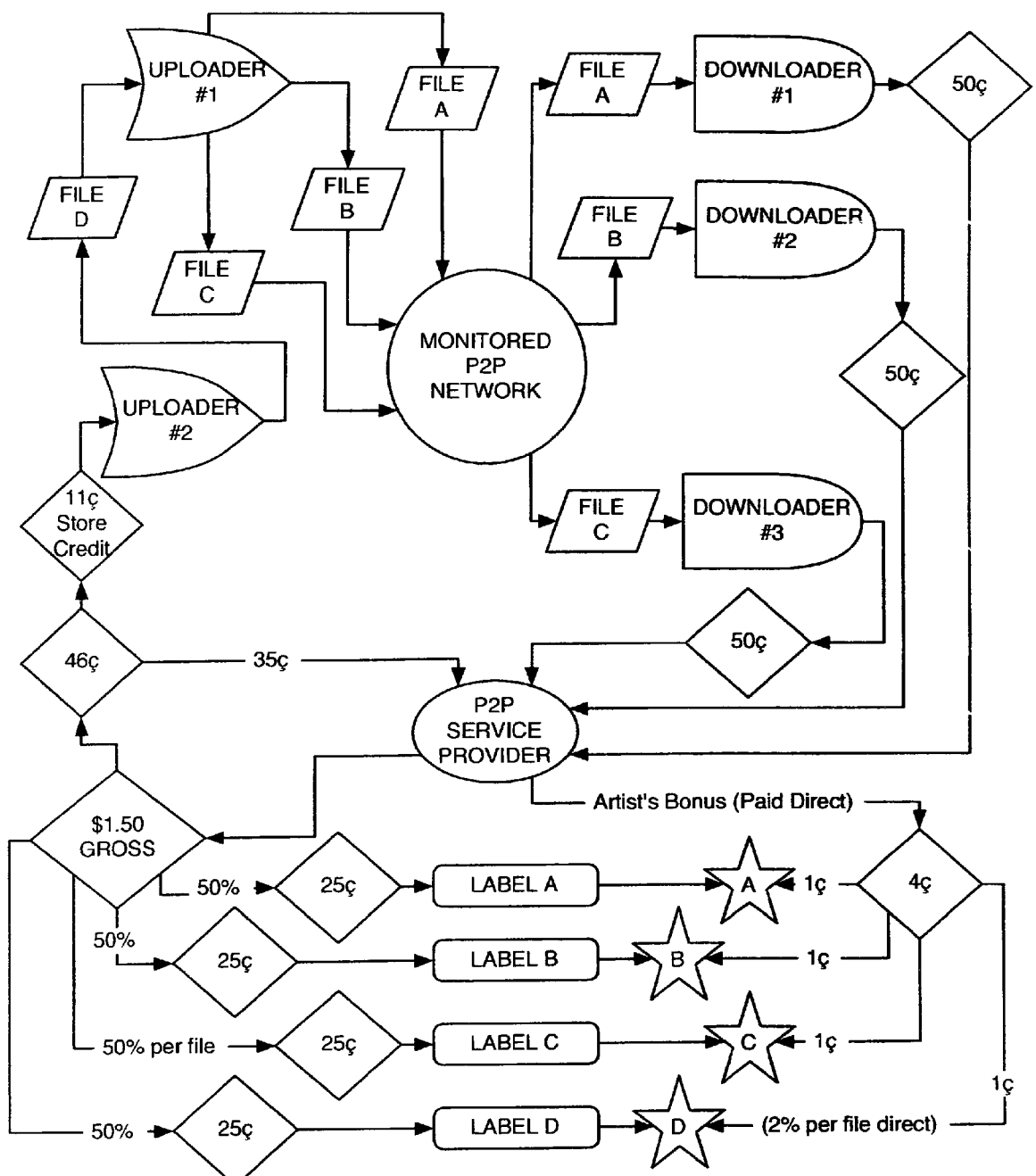
FIG. 5 is a flow diagram of an incentive program such as a "three for one" incentive program offered by a P2P service provider according to non-limiting example embodiments.
Figure 15:
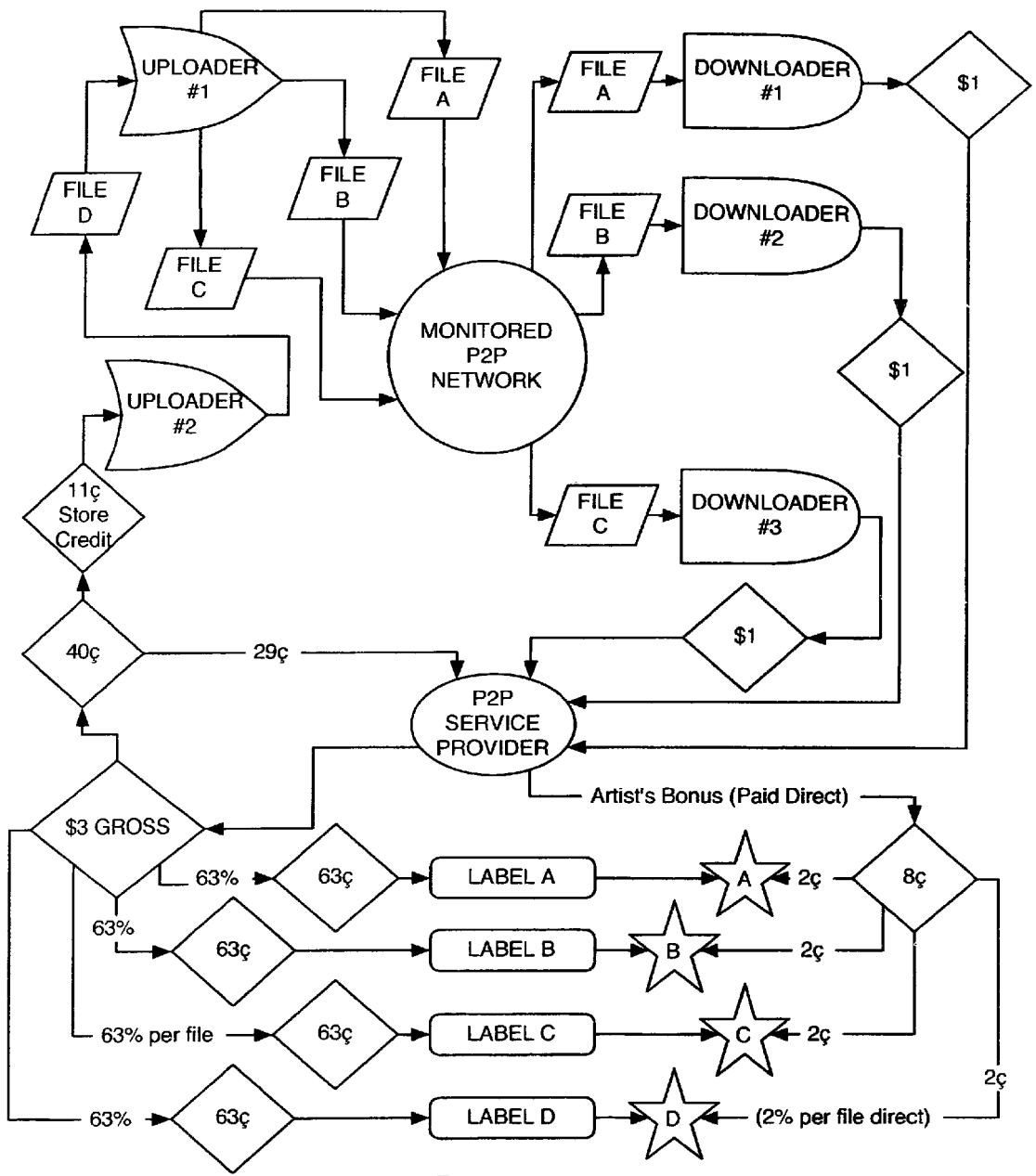
FIG. 15 is a flow diagram of an incentive program such as a "three for one" incentive program offered by a P2P service provider according to non-limiting example embodiments.

As would be apparent to those skilled in the art, this example may be modified in many ways for example, to provide a three-for-one incentive program, in accordance with example embodiments. Non-limiting examples of three-for-one programs are depicted in FIG. 5 and FIG. 15. In a three-for-one system for example, Uploader #1 may receive a "file credit" for the direct transactions in which Uploader 1 provided three files purchased by Downloaders #1, #2 and #3, which would generate a gross of $1.50. Uploader #1 can then redeem this file credit for merchandise from the Online store, or redeem the credit for a file. In the three-for-one scenario, a licensing fee of 25 cents for example, would be due to each of the three labels relating to files downloaded by Downloaders #1-3, as well as to the fourth label relating to the file for which Uploader #1 redeemed the file credit, for a total of $1, leaving a 50 cent gross revenue for the P2P service, from which 4 cents in Artists bonuses (1 cent each for four artists) are paid out. Of the 46 cents remaining, a percentage or fixed amount (such as 11 cents as in the example depicted in FIG. 5) may go to Uploader #2 for store credit. Accordingly, before the incentive is paid to Uploader #2, a three-for-one program provides 46 cents for four transactions (11.5 cents per file) as opposed to 22 cents for three transactions (7.33 cents per file) in the two-for-one swap scenario. Similarly, a greater gross revenue may be obtained for the P2P service in a four-for-one swap and so on.

Figure 6:
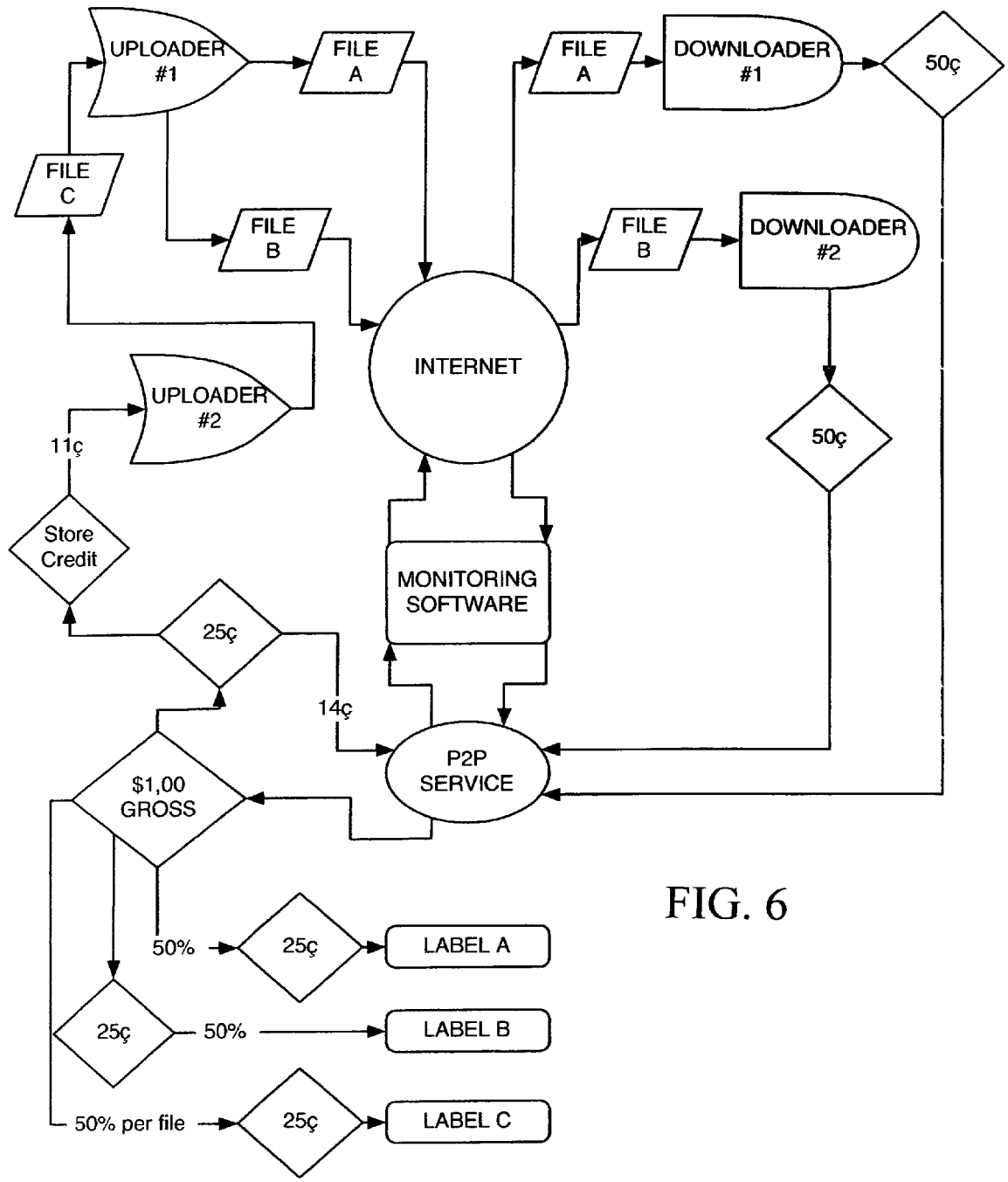
FIG. 6 is a flow diagram of an incentive program such as a "two for one" incentive program offered by a P2P service provider according to non-limiting example embodiments.

Example methods and systems may be also be modified to eliminate the 2% artist bonus, to change the amounts charged, to change the percentages provided to content providers/labels, to change the amount or type of credits awarded, etc. For example, in the embodiments of FIG. 15, the amount charged is $1 per file downloaded. By way of further example, in the embodiments of FIG. 6, no artist bonus is paid.

Figure 7:
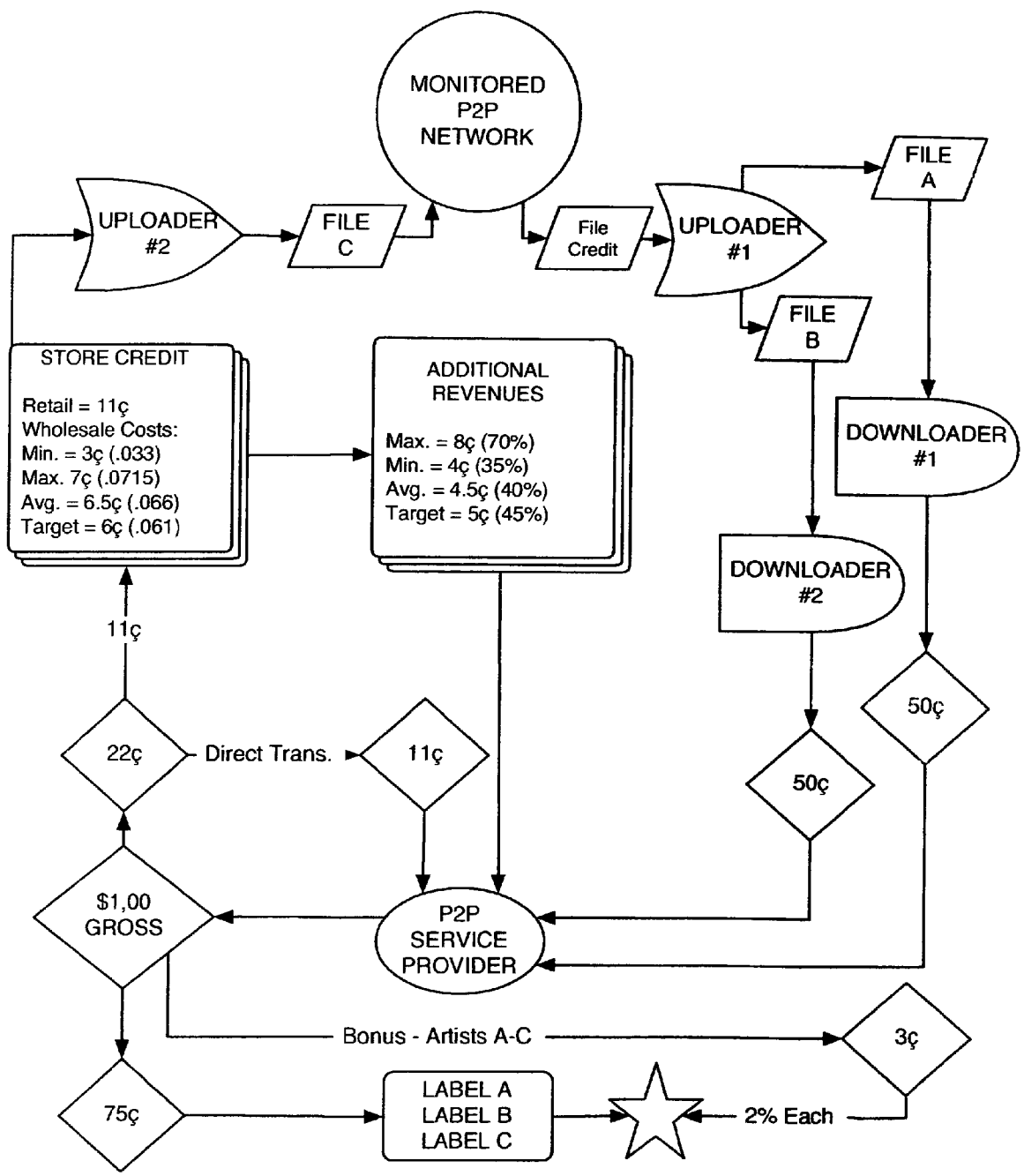
FIG. 7 is a flow diagram of an incentive program offered by a P2P service provider according to non-limiting example embodiments.

FIG. 7 is a flow diagram depicting the indirect transaction portion of FIG. 4 in which Uploader #1 redeems a file credit. As depicted in FIG. 4 (discussed in Example 3), Uploader #2 transferred one file (File C) to compensate Uploader #1 in exchange for Files A and B to paying Downloaders #1 and #2 of files A and B. This completed the initial paid Direct Transaction. Uploader #2 then receives store credit, which in FIGS. 4 and 7 may be for example 50% (e.g., 11 cents) of the amount remaining from the $1 gross after the Labels and/or artists from all three transactions are compensated. This store credit may be redeemed at the online store, but cannot be used to download files.

Because there may be a mark up on the merchandise sold through the online store ranging from 35% to 75%, an additional 4 to 8 cents in additional revenue may be generated for the P2P service. Combined with the 11 cents received from the Direct transaction, this gives the P2P service roughly 15-19 cents gross revenue before operating costs and transaction fees are deducted.

Figure 8:
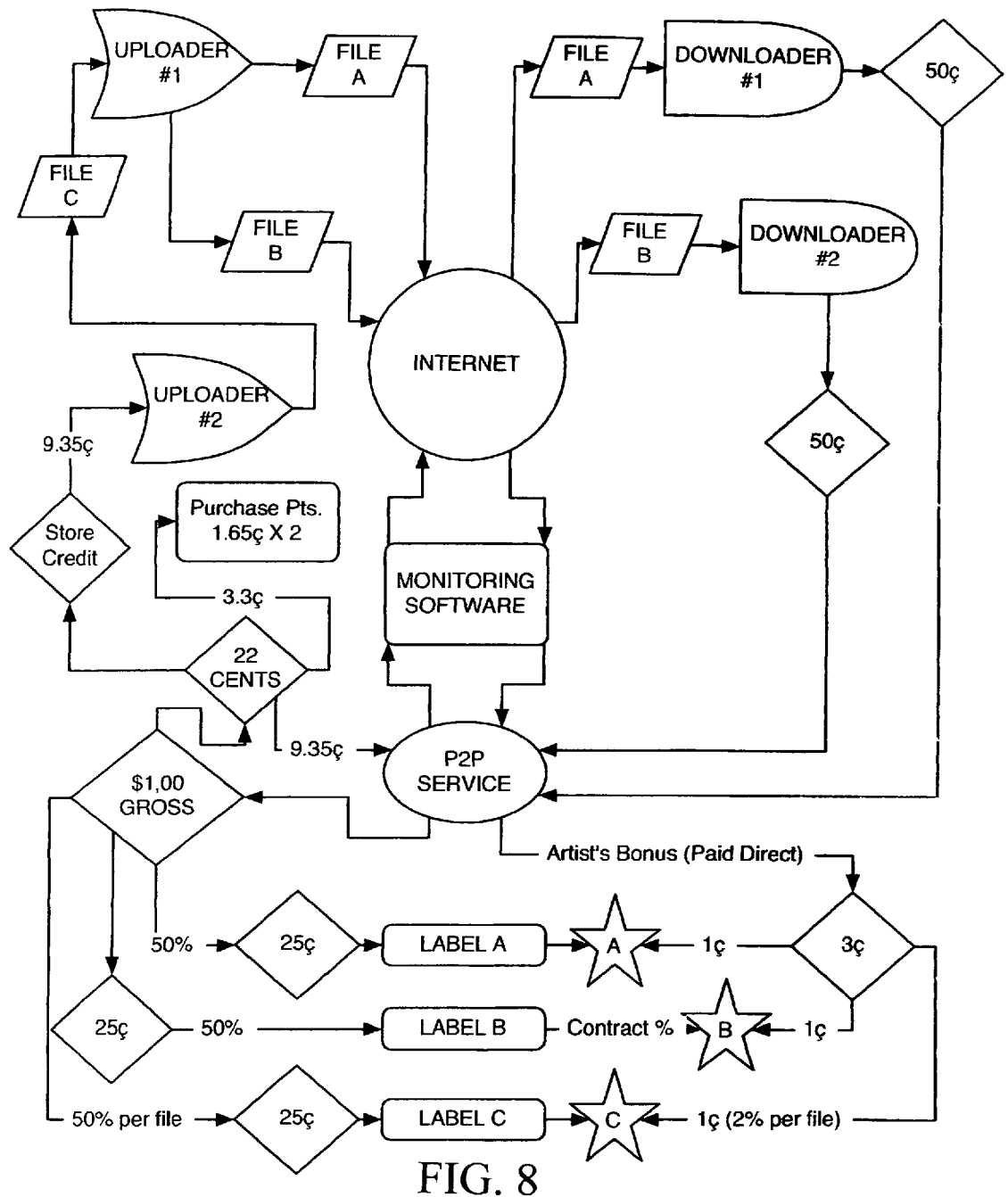
FIG. 8 is a flow diagram of an incentive program offered by a P2P service provider according to non-limiting example embodiments.

FIG. 8 is another flow diagram depicting a "two for one" swap transaction, as in FIG. 4, in which file credits are awarded to Uploader #1, which are redeemed at either the online store or for a file. This diagram also includes a purchase incentive or "Purchase Points" which may be rewarded to the downloader and can also be redeemed for files or merchandise, but at a lower percentage than they would receive for uploading a file. (e.g., Purchasing twenty files would allow the user to redeem one File Credit).

Figure 9:
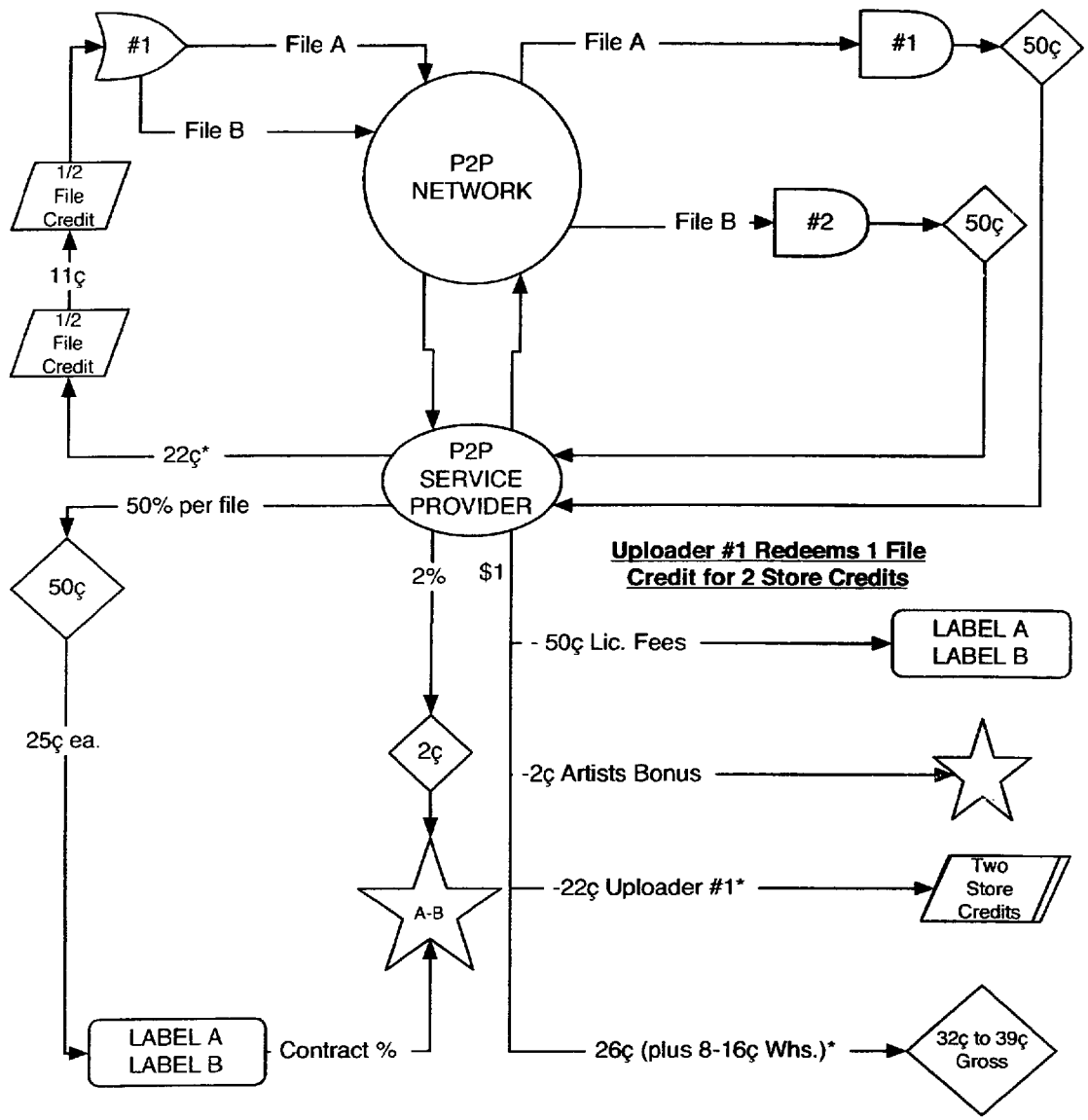
FIG. 9 is a flow diagram of an incentive program offered by a P2P service provider according to non-limiting example embodiments.

FIG. 9 is a flow diagram depicting the situation in which Uploader #1 redeems file credits at an online store, rather than redeeming them for files. A file credit may be redeemed for two store credits for example, and used towards 22 cents of the member's retail purchase. If Uploader #1 only has a "half credit", i.e., only one user has paid to download one of their files, then Uploader #1 may redeem the "half credit" for 11 cents worth of store credit.

As depicted in FIG. 9, because only two files are downloaded, only two Labels are compensated, and only two artist bonuses to be paid (instead of three). Thus, the licensing and bonus cost to the P2P provider may be only 52 cents, as opposed to 78 cents when Uploader #1 redeems credit for files. If Uploader #1's credits are worth 22 cents in store credit, the gross margin for the P2P provider is 26 cents (plus 8 to 16 cents due to the difference between the wholesale price and the mark up of store merchandise). Additionally, under this scenario, there is no Uploader #2 and thus, no incentive paid out to Uploader #2.

Example 4

According to further embodiments, premium digital files may be purchased, for example, from the central server provided by the P2P service provider or through an alliance with other music providers. These files may be purchased at a higher price than MP3 type files, e.g., for 99 cents, with licensing fees for premium files likely costing more than for MP3 files, for example 65 cents per file. Incentive programs may also be in place relating to the premium digital files. The types or amounts of credits required to redeem a premium digital file or awarded for uploading premium digital files may vary depending on the type of the file. For example, four silver credits (or 2 gold credits) may be required to redeem a digital file (e.g., a .wav or .aaf file) as opposed to two silver credits (or 1 gold credit) required to redeem a lesser quality MP3 file.

Figure 10:
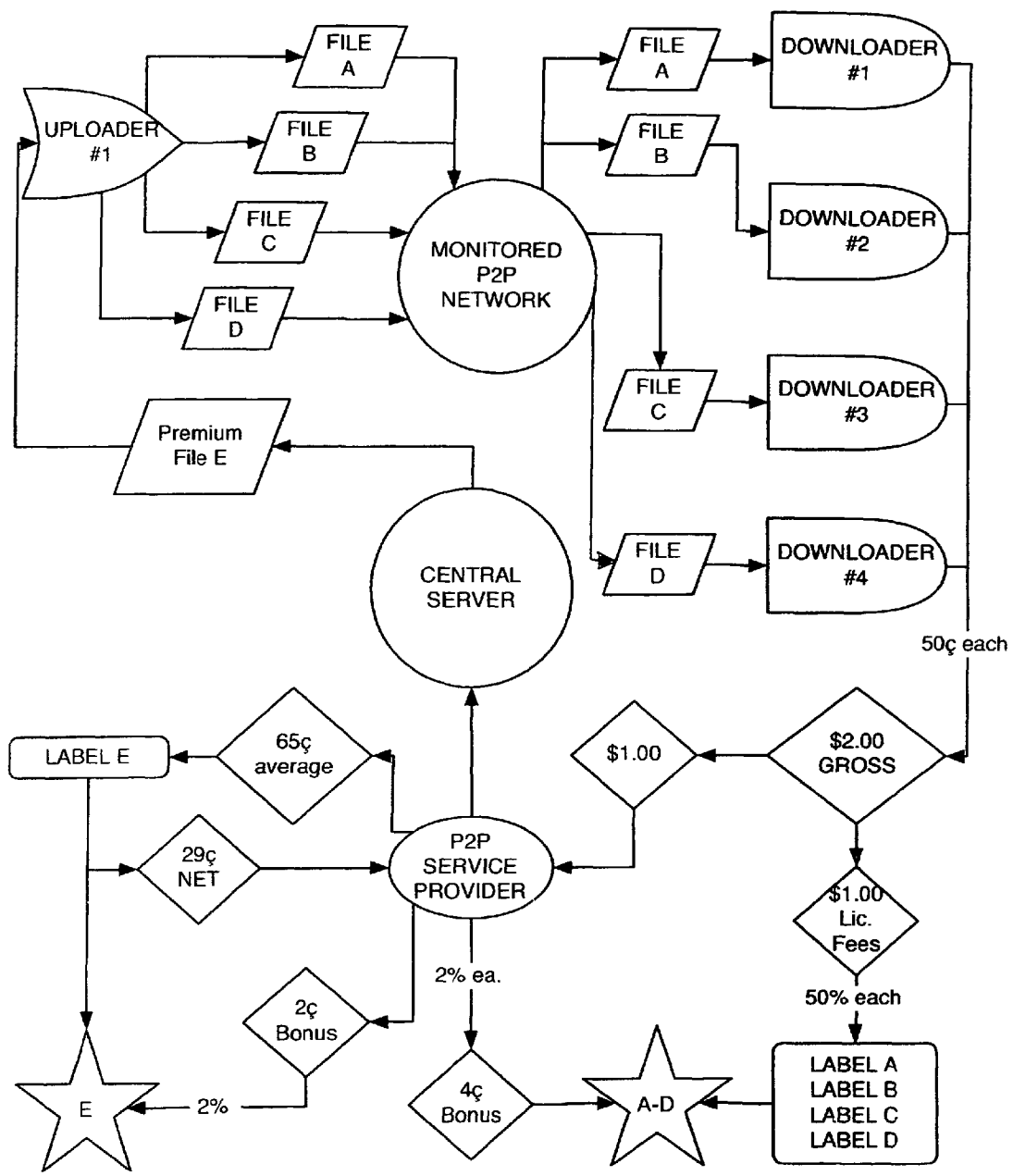
FIG. 10 is a flow diagram of an incentive program offered by a P2P service provider according to non-limiting example embodiments.

FIG. 10 depicts an example of a situation in which four files are purchased for which Uploader #1 receives four silver credits, allowing him to redeem the credits for one premium file. The four files are directly purchased for 50 cents each yielding a $2 gross. Of that, $1 is paid in license fees for the four downloaded files and 4 cents is provided in artist bonus. Of the remaining 96 cents, an average of 65 cents may be paid as a license fee to the label authorizing the premium file download (the going rate on a license fee for a premium digital file ranges from 60 cents to 70 cents), and another artist bonus of 2 cents (i.e., 2% of $1.00) is provided to the artist of the premium file, yielding 29 cents profit to the P2P provider relating to the five transactions. Certain services or providers may have restrictions on the number of times a premium download can pass from one computer to another. Such restrictions may eventually be removed however, in example methods where the content provider is compensated for each transaction.

As with the premium digital file scenario, ring tone, movie and other files may be purchased for different prices, and may be redeemed using different types and/or numbers of credits. Just as a premium digital file costs more to download directly and requires four credits to redeem indirectly, a movie download may cost even more or require even more credits to redeem.

Example 5

Users may desire to burn CDs of certain music compilations, for example, a CD containing their favorite songs to play in their car CD player. Such burning of CDs may be possible from the P2P service website, or it may be possible for users to do this on their computers after files are downloaded.

It should be noted that while copying purchased music to a CD for ones own personal use may be legitimate, burning CDs for distribution, sale or use by others, may constitute a copyright violation and may be illegal. Burning CDs for such illegal purposes is not condoned by the present inventor and may be discouraged by the P2P provider.

Figure 11:
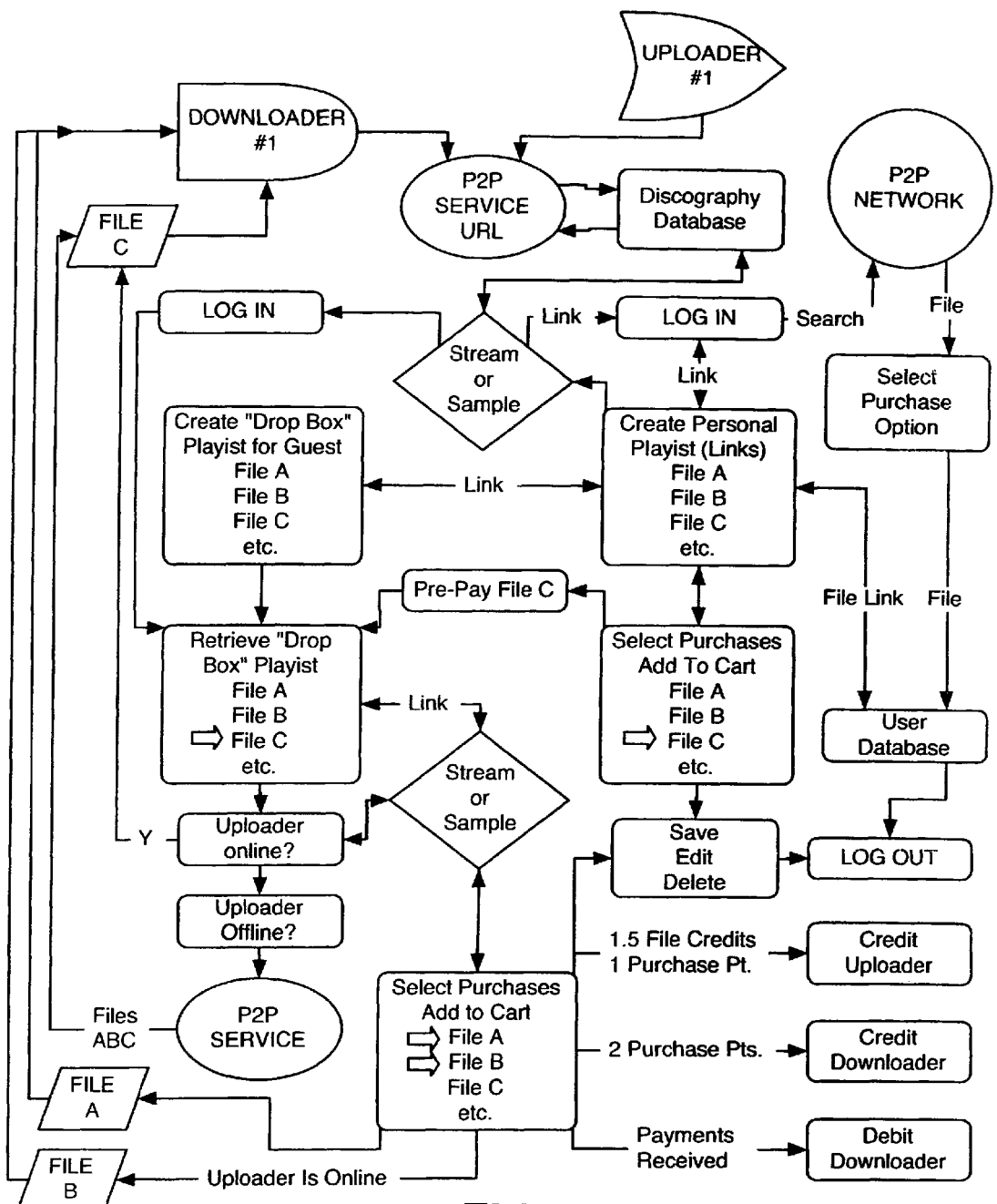
FIG. 11 is a flow diagram of a drop box option according to non-limiting example embodiments.

Also provided are methods and systems for legally sharing music with friends in the following manner. According to certain embodiments, one member may upload the song or songs into a "drop box" where their personal friends or acquaintances can find songs that they have talked about through this system, or offline by word of mouth. Non-limiting examples of possible drop box systems and methods are depicted in FIG. 11. The drop box may be for example a dedicated space on the central server where files could be stored so that a second user can find them, for example, when their friend is not online by entering their username. Instead of a user burning a copy of music for friends, they can tell their friend that the user will upload the files into their drop box, and the friend can download the files from the user's account. The friend must pay to download the files. According to certain embodiments, the user/uploader may be given some form of credit for creating an interest in the music.

Therefore, example embodiments include methods that include allowing a guest user to access a predetermined subset of files, which access is authorized by a registered user of a peer-to-peer network; wherein the guest user may preview one or more file in the subset of files; and wherein the guest user may purchase one or more file in the subset of files. The access may be granted in a variety of ways, such as by a dynamic link sent to the guest user by email. The guest user may be allowed to preview the file, for example by streaming samples of the files or viewing read only versions of the files to avoid additional ephemeral fees charged by content owners. It is also contemplated that either user be able to create a temporary playlist, for example by "dragging and dropping" clicking an "add to playlist" button or by highlighting, copying and pasting at least one link into the buffer. This playlist may interface with an audio player which would play the sample links and would also allow the member to play songs already in their library. The guest user may be prompted with instructions to purchase or redeem the files over a peer-to-peer network, download the file later, or purchase the files through a premium content provider. The buffer may connect to the user's personal database allowing them to also listen to and/or view files previously created or acquired. Users may create a plurality of playlists, and may be prompted to save, edit or delete playlists.

Example methods may include requiring payment for the download from the guest user or the registered user. Optionally, the registered user or guest user may prepay for the download. The one or more files may be downloaded directly from the registered user, for example if the registered user is logged into the system. But it is contemplated that the one or more files may be downloaded from a third user, for example if the registered user if not logged onto the system. Thus, according to these embodiments, the guest user can see and have at least some access to a registered user's playlist, but the actual downloaded file may come from a third user.

It is also contemplated that protections may be provided for a member to invite certain friends to view only particular drop boxes or their personal playlists lists of files, without gaining complete access to other drop boxes or files, or to the complete account. It may also be possible for more than one friend to view or access the drop box at a time, or for the friend to access the drop box in the event the member/uploader logs off.

It is further contemplated that a member can create a drop box or other list of one or more files, and send an email to friends that forwards samples of those files (e.g., snippets of the file or the entire file) to the friends or a link to the member's drop box. A link or way in which the friends can download the files may be provided. The Uploading member might also be prompted to purchase the files for the downloading member through a pre-payment method.

Example embodiments include a computer readable program product including a computer readable medium and a program that allows a first user to create lists of files, for which a second user may have limited access, and may be able to purchase for download.

There are several ways that a member could share files obtained through this service outside the system to try to avoid payment. These include, but are not limited to: sending the file via E-mail, Instant Messenger, burning to disc, and hard-drive swapping. To protect the content owner's intellectual property in these circumstances, example embodiments would "tag" purchased files with the most recent owner's information. If the file is transferred outside the system showing a gap in ownership without payment to the content owners, the file may display a prompt when opened to inform the recipient that the file has been improperly transferred. This prompt may or may not include by way of non-limiting example; information about the previous owner, a link to the service where the recipient can sample the file, a message from the sender to announce that they are receiving the file as a gift, a message that informs the recipient that the file will be disqualified from receiving incentive credits or points, instructions to purchase the file legally, a warning about the potential risks of malicious software that may be transferred to their computer when opening a file that has been improperly traded outside the system, advertising, and/or other information. An example embodiment may use files "wrapped" in digital rights management (DRM) protection to control the sampling, use, or further distribution of the file.

Example 6

Chat Rooms may be available on the website or client software, for example in different genres and in different artist sections, allowing consumers to communicate instantly with questions about different music and allowing personalized trades to be made. These chat rooms may operate as songs are played over an online radio station. The online radio station may be ad supported or ad free. As music is playing on the online radio station, a link may be provided on the audio or video player indicating the name of the artist and song, allowing members to quickly download the song that is playing, or any of the recently played songs from either the premium download store, or the peer to peer network (e.g., the last 10 songs may be listed with links to download any of those songs). Which online radio station is playing may vary for example based on a member's music preference as inputted by the member, as determined based on previous downloads, or depending on which chat rooms the member is in. Similar links could be available on the web site to link directly to a peer-to-peer network.

Members may be able to post reviews of their favorite artists or genres of music and other unique music that exists in their collection. Consumers would click on the links in these reviews and go straight to that member's hard drive to download those tracks.

It is contemplated that members may be able to be a DJ for example, by sending a file having them talk over the introduction of a song, phoning in their request, or sending a separate clip that would be added before the song starts.

Example 7

A "This Lane Closed" feature may be used by a member to turn file sharing off without interrupting downloads in process. This would allow any downloads in process to be completed, but not allow any new downloads to begin. FIGS. 12, 13 and 14 are non-limiting examples of possible screen shots of various stages of "this lane closed" features according to example embodiments. If the user logs off before downloads in process are completed, they will not receive credit for those interrupted partial downloads. The member may select this option, for example, when the member is getting ready to log off of the P2P network. As depicted in FIG. 12, the user may have an option of clicking on a "lane closing on/off" button. Alternatively, a "This Lane Closed" feature may be automatically implemented simply by the user beginning a logging off or shutting down process. Accordingly, in example methods, in a process of the second user logging off, any transactions in progress may be permitted to be completed, but no new transactions involving the second user may be permitted to begin. Any first users may be informed that the second user is logging off and the second user's files are unavailable for download. Such notifications that a lane closing is in progress or completed are depicted in FIGS. 13 and 14

Accordingly, example embodiments include a computer readable program product including a computer readable medium and a program that allows a user to turn file sharing off without interrupting downloads in process and allowing any downloads in process to be completed, but not allow any new downloads to begin.

Example 8

According to further example embodiments, bit-torrent may be used to speed up downloads by transferring different segments of a file from different members. Although it may be simpler when one member is being compensated for providing a file, it may be feasible to divide compensation among two or more members. The present methods, programs, systems and the like may be modified to utilize bit-torrent, as would be apparent to those skilled in the art.

Example 9

This example sets forth various methods of variable pricing of files according to different example embodiments.

According to example embodiments, the prices have a common denominator, such as 25¢ or 50¢. Thus, the prices of various files may be as follows:

25¢
50¢
75¢
$1.00 $1.25
$1.50
$1.75
$2.00 (e.g., Videos And Ring Tones); or
50¢
$1.00
$1.50
$2.00
$2.50
$3.00
$3.50
$4.00

It is contemplated, that the pricing structure may vary somewhat from the common denominator, for example by selling files for 25¢, 50¢, 75¢ and 99¢ and be within the scope of the present invention.

In embodiments where various prices are used for different files, different credits or points may be earned by the downloader depending on the file purchased and the price of that file. Examples of points or credits earned for various files may be as follows:

Purchase 1 file @ 25¢=Receive 1 File Point
Purchase 10 files @ 25¢=10 File Points (1 Silver Credit)
Purchase 20 files @ 25¢=20 File Points (1 Gold Credit)
Purchase 1 file @ 50¢=2 File Points
Purchase 5 files @ 50¢=10 File Points (1 Silver Credit)
Purchase 10 file @ 50¢=20 File Points (1 Gold Credit)
Purchase 1 file @ 75¢=3 File Points
Purchase 4 files @ 75∞=12 File Points (1 Silver Credit+2 File Points)
Purchase 7 files @ 75¢=21 File Points (1 Gold Credit+1 File Point)
Purchase 1 file @ $1.00=4 File Points
Purchase 3 files @ $1.00=12 File Points (1 Silver Credit+2 File Points)
Purchase 5 files @ $1.00=20 File Points (1 Gold Credit)
Purchase 1 file @ $1.25=5 File Points
Purchase 2 files @ $1.25=10 File Points (1 Silver Credit)
Purchase 4 files @ $1.25=20 File Points (1 Gold Credit)
Purchase 1 file @ $1.50=6 File Points
Purchase 2 files @ $1.50=12 File Points (1 Silver Credit+2 File Points)
Purchase 4 files @ $1.50=24 File Points (1 Gold Credit+4 Points)
Purchase 1 file @ $1.75=7 File Points
Purchase 2 files @ $1.75=14 File Points (1 Silver Credit+4 File Points)
Purchase 3 files @ $1.75=21 File Points (1 Gold Credit+1 File Point)
Purchase 1 file @ $2.00=8 File Points
Purchase 2 files @ $2.00=16 File Points (1 Silver Credit+6 File Points)
Purchase 3 files @ $2.00=24 File Points (1 Gold Credit+4 File Points)

In embodiments where various prices are used for different files, different credits or points may be earned by the uploader depending on the file purchased and the price of that file. Examples of points or credits earned for various files may be as follows:

Sell 1 file @ 25¢=5 File Points
Sell 2 files @ 25¢=10 File Points (1 Silver Credit)
Sell 3 files @ 25¢=15 File Points (1 Silver Credit+5 File Points)
Sell 4 files @ 25¢=20 File Points (1 Gold Credit)
Sell 1 file @ 50¢=10 File Points (1 Silver Credit)
Sell 2 files @ 50¢=20 File Points (1 Gold Credit)
Sell 3 file @ 50¢=30 File Points (1 Gold+Silver)
Sell 4 files @ 50¢=40 File Points (2 Gold Credits)
Sell 1 file @ 75¢=15 File Points (1 Silver+File 5 Points)
Sell 2 files @ 75¢=30 File Points (1 Gold+1 Silver)
Sell 3 files @ 75¢=45 File Points (1 Gold+1 Silver+5 File Points)
Sell 4 files @ 75¢=60 File Points (2 Gold Credits)
Sell 1 file @ $1.00=20 File Points (1 Gold Credit)
Sell 2 files @ $1.00=40 File Points (2 Gold Credits)
Sell 3 files @ $1.00=60 File Points (3 Gold Credits)
Sell 4 file @ $1.00=80 File Points (4 Gold Credits)
Sell 1 file @ $1.25=25 File Points (1 Gold Credit+5 File Points)
Sell 2 files @ $1.25=50 File Points (2 Gold+1 Silver)
Sell 3 files @ $1.25=75 File Points (3 Gold+1 Silver=5 File Points)
Sell 4 files @ $1.25=100 File Points (4 Gold Credits) ($1.00 Store Credit)
Sell 1 file @ $1.50=30 File Points (1 Gold+1 Silver)
Sell 2 files @ $1.50=60 File Points (3 Gold Credits)
Sell 3 files @ $1.50=90 File Points (4 Gold+1 Silver)
Sell 4 files @ $1.50=120 File Points (6 Gold Credits)
Sell 1 file @ $1.75=35 File Points (1 Gold+1 Silver+5 File Points)
Sell 2 files @ $1.75=70 File Points (3 Gold+1 Silver)
Sell 3 files @ $1.75=105 File Points (5 Gold+5 File Points)
Sell 4 files @ $1.75=140 File Points (7 Gold Credits)
Sell 1 file @ $2.00=100 File Points (5 Gold Credits)
Sell 2 files @ $2.00=200 File Points (10 Gold Credits)
Sell 3 files @ $2.00=300 File Points (15 Gold Credits)
Sell 4 files @ $2.00=400 File Points (20 Gold Credits)

According to certain embodiments, a certain number and/or type of points may be redeemable for a certain amount of store credit. For example, 100 points may be redeemable for one dollar of store credit.

Similarly, a certain number and/or type of points may be redeemable for files. The following is an example of a way in which credits may be redeemed for files.

25¢ (Redeem with 1 Silver Credit)
50¢ (Redeem with 1 Gold Credit)
75¢ (Redeem with 1 Gold, and 1 Silver)

$1.00 (Redeem with 2 Gold Credits)
$1.25 (Redeem with 2 Gold and 1 Silver)
$1.50 (Redeem with 3 Gold Credits)
$1.75 (Redeem with 3 Gold and 1 Silver)
$2.00 (Redeem with 4 Gold Credits)

Files may also be traded for store credit, for example as follows:

Trade 1 File @ 25¢=5 Store Points
Trade 1 File @ 50¢=10 Store Points (1 Store Credit)
Trade 1 File @ 75¢=15 Store Points
Trade 1 File @ $1.00=20 Store Points (2 Store Credits)
Trade 1 File @ $1.25=25 Store Points
Trade 1 File @ $1.50=30 Store Points (3 Store Credit)
Trade 1 File @ $1.75=35 Store Points
Trade 1 File @ $2.00=40 Store Points (4 Store Credits)

According to example embodiments, certain rules may be set up, for example to optimize profitability or to provide various incentives. Examples of such rules include one or more of the following: (1) store points cannot be redeemed for files; (2) content providers requiring a certain percentage of the purchase price or profit, cannot sell their files or set a price that is less than a certain amount (such as $1, as depicted in FIG. 15 where the content owners are receiving over 60% in royalties); (3) for trades for small amounts, such as less than $1, the downloader must set up a paypal or similar account with a minimum balance or pay a transaction fee. Another example of a possible rule, is that members who wish to remain anonymous cannot redeem credits for merchandise because the user must be identified to receive shipments. Yet another example of a possible rule in accordance with example embodiments is that members who log off without first enabling the "lane closing" feature and allowing downloads in process to be completed will not receive credit for those downloads.

According to example embodiments, a rule may be implemented that would disqualify members from receiving incentive points for files that are obtained from the service and shared outside the system without payment to the content owners. Certain embodiments may disqualify only the recipient of the file from receiving incentive credits or points for future use of that file. Other embodiments may disqualify both the uploader and the downloader of the file. Other options may include, suspending the account of the sender, or disabling their file(s) and/or their account(s) completely.

A further example of rules may be implemented when a member shares a file with a guest using a drop box feature. In these embodiments, the member receives "purchase points" when they prepay in cash for a file, even if they are not online when the file is retrieved. Uploaders also receive credits (e.g., half credits) for each file they share, but only if they are online to upload the file at the time it is retrieved. This incentive keeps more members on the system sharing and supplying music for others. Finally, members sharing files receive purchase points only when they purchase the files with cash, but not when they use credits to redeem a file.

Different ways in which one can earn different amounts and kinds of credits may be as follows:

Trading Rates and Earning Files
Sell 1 file @ 25¢=½ Silver Credit
Sell 2 files @ 25¢=1 Silver Credit
Sell 1 file @ 50¢=1 Silver Credit
Sell 2 files @ 50¢=1 Gold Credit
Sell 1 file @ $1=1 Gold Credit
Pricing—25 Cents Files (Silver Credit)
Purchase 10 files @ 25¢
Sell 2 Files @ 25¢
Sell 1 File @ 50¢
50 Cent Files (Gold Credit)
Purchase 10 files @ 50¢
Sell 2 Files 50¢
Sell 1 File @ $1
75 Cent Files
Purchase 10 files @ 75¢
Sell 6 files @ 25¢ (3 Silvers)
Sell 2 files @ 50¢+2 Files @ 25¢ (1 Gold+1 Silver)
One Dollar Files
Purchase 10 Files @ $1
Sell 8 Files @ 25¢ (4 Silvers)
Sell 6 Files @ 25¢+1 File @ 50¢ (4 Silvers)
Sell 4 Files @ 25¢+2 Files @ 50¢ (4 Silvers)
Sell 2 Files @ 25¢+3 Files @ 50¢ (4 Silvers)
Sell 4 Files @ 50¢ (2 Golds)
One Dollar Twenty Five Cent Files
Purchase 10 Files @ $1.25
Sell 2 Files @ $1.25 (2 Golds+1 Silver)
Sell 10 Files @ 25¢ (5 Silvers)
Sell 8 Files @ 25¢+1 File @ 50¢ (5 Silvers)
Sell 6 Files @ 25¢+2 Files @ 50¢ (5 Silvers)
Sell 4 Files @ 25¢+3 Files @ 50¢ (5 Silvers)
Sell 2 Files @ 25¢+4 Files @ 50¢ (5 Silvers)
One Dollar Fifty Cents
Purchase 10 Files @ $1.50
Sell 2 Files @ $1.50 (3 Golds)
Sell 4 Files @ 75¢ (3 Golds)
Sell 12 Files @ 25¢ (6 Silvers)
Sell 10 Files @ 25¢+1 File @ 50¢ (6 Silvers)
Sell 8 Files @ 25¢+2 File @ 50¢ (6 Silvers)
Sell 6 Files @ 25¢+3 Files @ 50¢ (6 Silvers)
Sell 4 Files @ 25¢+4 Files @ 50¢ (6 Silvers)
Sell 2 Files @ 25¢+5 Files @ 50¢ (6 Silvers)

Although certain specific embodiments have been described, many additional modifications and variations would be apparent to those skilled in the art. For example, member credits could be redeemed for cash instead of music and merchandise, or, the artist bonus could be excluded entirely. However, distributing a direct bonus to an artist would encourage them to license their catalogs and build good faith. For at least these reasons, it is believed that the present programs provide superior models, without ruling out cash distributions to members or exclusion of the artist bonus program. It is therefore to be understood that embodiments may be practiced other than as specifically described. Thus, the present embodiments should be considered in all respects as illustrative and not restrictive.

What is claimed is:

1. A file sharing method comprising
receiving a request from a first user computing device for at least one file;
searching for a second user computing device possessing a copy of said file;
allowing said first user to download said file to a hard drive of a first user computing device from a second user computing device possessing a copy of said file, provided that said file does not include a file tag indicating a gap in ownership where one or more content owners were not compensated;
processing a debit of an account on a server corresponding to said first user;
processing a credit of an account on a server corresponding to said second user; and
processing a license fee to at least one content owner of said file.

2. The method of claim 1, wherein said searching includes searching for a digital fingerprint associated with a file.

3. The method of claim 1, further comprising compensating at least one artist associated with said file.

4. The method of claim 1, wherein the at least one file is selected from the group consisting of music, movies, games, video games, television programs, videos, podcasts, software, advertisements, artwork, ring tones, literature and photos.

5. The method of claim 1, wherein at least one of said charging and processing steps is conducted within a secure website.

6. The method of claim 1, wherein said request from said first user computing device is received by the user clicking on a dynamic link.

7. The method of claim 1, further comprising determining whether at least one of said users computing devices has updated virus software before allowing said first user computing device to download said file.

8. The method of claim 1, further comprising scanning said file for malicious files before allowing said first user computing device to download said file.

9. The method of claim 1, wherein in a process of said second user logging off, any transactions in progress are permitted to be completed, but no new transactions involving the second user computing device are permitted to begin.

10. The method of claim 1, wherein at least one of said users is alerted by a prompt on a computing device if a file tag shows a gap in ownership.

11. The method of claim 1, wherein at least one of said users is alerted by a prompt on a computing device if the file has been altered from the original digital fingerprint.

12. A file sharing method comprising
receiving a request from a first user computing device for at least one file;
searching for a second user computing device possessing a copy of said file;
allowing said first user to download said file to a hard drive of a first user computing device from a second user computer device possessing a copy of said file;
charging a first user money or credits from an account on a server for said file;
processing a credit of an account on a server corresponding to said second user; and
processing a license fee to at least one content owner of said file;
wherein one or more of said users is disqualified from receiving credits for files tagged with information indicating a gap in ownership of said file.

13. The method of claim 12, further comprising, downloading a copy of said file from a premium content provider if a second user computing device possessing a copy of said file is not identified.

14. The method of claim 12, further comprising compensating at least one artist associated with said file.

15. The method of claim 12, wherein the at least one file is selected from the group consisting of music, movies, games, video games, television programs, videos, podcasts, software, advertisements, artwork, ring tones, literature and photos.

16. The method of claim 12, wherein at least one of said charging and processing steps is conducted within a secure website.

17. The method of claim 12, wherein said request from said first user computing device is received by the user clicking on a dynamic link.

18. The method of claim 12, further comprising determining whether at least one of said users computing devices has updated virus software before allowing said first user computing device to download said file.

19. The method of claim 12, further comprising scanning said file for malicious files before allowing said first user computing device to download said file.

20. The method of claim 12, wherein in a process of said second user logging off, any transactions in progress are permitted to be completed, but no new transactions involving the second user computing device are permitted to begin.

21. The method of claim 12, wherein at least one of said users is alerted by a prompt on a computing device if a file tag shows a gap in ownership.

22. The method of claim 12, wherein at least one of said users is alerted by a prompt on a computing device if the file has been altered from the original digital fingerprint.

* * * * *